(12) United States Patent
Qiu et al.

(10) Patent No.: US 12,091,844 B2
(45) Date of Patent: Sep. 17, 2024

(54) FAUCET AND FILTRATION SYSTEM HAVING FAUCET

(71) Applicant: Solventum Intellectual Properties Company, Maplewood, MN (US)

(72) Inventors: Biyong Qiu, Shanghai (CN); JianYi Song, Fujian (CN)

(73) Assignee: Solventum Intellectual Properties Company, Maplewood, MN (US)

( * ) Notice: Subject to any disclaimer, the term of this patent is extended or adjusted under 35 U.S.C. 154(b) by 0 days.

(21) Appl. No.: 17/767,646

(22) PCT Filed: Nov. 2, 2020

(86) PCT No.: PCT/IB2020/060273
§ 371 (c)(1),
(2) Date: Apr. 8, 2022

(87) PCT Pub. No.: WO2021/090145
PCT Pub. Date: May 14, 2021

(65) Prior Publication Data
US 2024/0084562 A1    Mar. 14, 2024

(30) Foreign Application Priority Data

Nov. 8, 2019   (CN) .......................... 201911087251.7

(51) Int. Cl.
*E03C 1/04* (2006.01)
*F16K 11/078* (2006.01)
(52) U.S. Cl.
CPC .......... *E03C 1/0404* (2013.01); *E03C 1/0403* (2013.01); *F16K 11/0782* (2013.01); *E03C 2201/30* (2013.01); *E03C 2201/40* (2013.01)
(58) Field of Classification Search
CPC .. E03C 1/0404; E03C 1/0403; E03C 2201/30; E03C 2201/40; F16K 11/0782
(Continued)

(56) References Cited

U.S. PATENT DOCUMENTS 8,613,293 B2   12/2013  Bolgar
2010/0180968 A1  7/2010  Heerklotz
(Continued)

FOREIGN PATENT DOCUMENTS

CN    206563104   10/2017
CN    107324525   11/2017
(Continued)

OTHER PUBLICATIONS

International Search Report for PCT International Application No. PCT/IB2020/060273, mailed on Feb. 2, 2021, 3 pages.

*Primary Examiner* — Huyen D Le

(57) ABSTRACT

The present invention relates to a filtration system (1) having the faucet (20). The faucet (20) comprises: a mixing valve, wherein the mixing valve is provided with a first inlet passage, a second inlet passage, and a mixing valve outlet passage, wherein the first inlet passage is connected to a first fluid line (L2), and the second inlet passage is connected to a second fluid line (L3); an outflowing pipe (23), wherein one end of the outflowing pipe (23) is connected to the mixing valve outlet passage; and a mode selection device (25), wherein the mode selection device (25) being operable to selectively allow one or both of the first fluid line (L2) and the second fluid line (L3) to communicate with the mixing valve outlet passage. The faucet (20) further comprises a mixing ratio adjustment device, the mixing ratio adjustment device and the mode selection device (25) operating independently from each other. The faucet (20) and the filtration system (1) according to the present invention can simplify operation of the faucet (20), allow the faucet (20) to be more in line with user's operating habits, reduce the number of parts and components, and enable configuration of appropriate mixing ratios according difficult use environments, (Continued)

thereby expanding the application scope of the faucet (20) and filtration system (1).

11 Claims, 21 Drawing Sheets

(58) Field of Classification Search
USPC .............................................................. 4/678
See application file for complete search history.

(56) References Cited

U.S. PATENT DOCUMENTS

| | | |
|---|---|---|
| 2018/0119394 A1 | 5/2018 | Zhan |
| 2020/0157789 A1* | 5/2020 | Awada ....................... E03C 1/04 |
| 2021/0010250 A1* | 1/2021 | Wang ......................... E03C 1/04 |
| 2022/0098839 A1* | 3/2022 | Tzeng ................... E03C 1/0404 |

FOREIGN PATENT DOCUMENTS

| | | |
|---|---|---|
| CN | 207864691 | 9/2018 |
| JP | H07-248071 | 9/1995 |

* cited by examiner

| | Municipal water supply pressure (psi) | 20 | 40 | 60 | 80 |
|---|---|---|---|---|---|
| | Purified water TDS (ppm) | 14 | 14 | 13 | 13 |
| | Mineral water TDS (ppm) | 168 | 174 | 174 | 173 |
| Mixed water TDS (ppm) | Third auxiliary port 2761C in commuication | 39 | 48.2 | 52.8 | 54 |
| | Second auxiliary port 2761B in commuication | 54.2 | 66 | 76.4 | 77.4 |
| | First auxiliary port 2761A in commuication | 66 | 80.6 | 87.4 | 87.6 |

*FIG. 28*

FAUCET AND FILTRATION SYSTEM HAVING FAUCET

CROSS REFERENCE TO RELATED APPLICATIONS

This application is a national stage filing under 35 U.S.C. 371 of PCT/IB2020/060273, filed Nov. 2, 2020, which claims the benefit of Chinese Application No. 201911087251.7, filed Nov. 8, 2019, the disclosure of which is incorporated by reference in its/their entirety herein.

TECHNICAL FIELD

The present invention relates to the field of filtration systems, and more particularly to a faucet of a filtration system and a filtration system having the faucet.

BACKGROUND

The content of this part provides only background information related to the present invention, and does not necessarily constitute the prior art.

As the quality of life improves, people are more concern about drinking water safety. The application of household water filters is growingly popular. Household water filters are adopted to remove impurities and mitigate the effect of poor water quality caused by water sources, transportation, and the like, so as to ensure water safety. Generally, a household water filter mainly includes a filtration assembly and a water faucet. Different filter media can be used in the filtration assembly to filter raw water (such as municipal tap water) for removing impurities or pollutants in the water. At present, commonly used filter media include, for example, an activated carbon filter element, a reverse osmosis membrane filter element, etc. When raw water is filtered by the activated carbon filter element, harmful pollutants are removed but minerals in the water remain. Mineral water containing minerals is thus obtained. When raw water is filtered by the reverse osmosis membrane filter element, both harmful pollutants and minerals in the water are removed. Purified water containing no minerals is then obtained. In order to meet user demands for water with different qualities, both the activated carbon filter element and the reverse osmosis membrane filter element are used in some of the household water filters to respectively filter raw water. That way, both mineral water containing minerals and purified water containing no minerals can be obtained. In order to simplify the structure of household water filters, some household water filters are configured to have a dual-outlet faucet for dispensing both mineral water and purified water. When mineral water is needed, the outlet having the activated carbon filter element communicates with the water faucet, so that mineral water is dispensed from the water faucet. When purified water is needed, the outlet having the osmosis membrane filter element communicates with the faucet, so that purified water is dispensed from the water faucet.

Scale deposits is commonly seen when using mineral water containing minerals for a long period of time. On the other hand, drinking purified water containing no minerals for a long time is not ideal for health reasons. As a result, the expectations on drinking water are raised—drinking water is expected to have less scale deposits and to meet human body's demand for minerals at the same time. Since water quality varies depending on regions and areas, many mixing ratios need to be provided for selection in order to cater to users needs in different regions and to expand the applications of the household water filter in different regions. In general, once a household water filter is installed, the mixing ratio for the mixed water remains relatively constant and normally does not need to be changed over a long period of time. Therefore, if a user wants to select an appropriate mixing ratio from a variety of mixing ratios with each use, a design having a constant mixing ratio would not meet the user's needs.

As a result, a novel household water filter is desired. The household water filter can provide both mineral water and purified water, and can also provide a mixture of both; and the mixing ratio of the mixed water is adjustable, so as to meet users' different requirements on the mixing ratio of the mixed water. It is also expected that the household water filter is easier to operate so as be to be more in line with the user's operating habits, and to reduce the likelihood of mistakenly selecting an inappropriate mixing ratio.

SUMMARY

An object of the present invention is to optimize the designs of a faucet and a filtration system having the faucet so as to be more in line with users' operating habits, to simplify the operation, and to ensure operation accuracy. Another object of the present invention is to optimize the designs of a faucet and a filtration system having the faucet so as to provide a plurality of mixed fluids with different mixing ratios and to meet the demands in different regions and for different users.

In one aspect of the present invention, a faucet is provided. The faucet comprises: a mixing valve, wherein the mixing valve is provided with a first inlet passage, a second inlet passage, and a mixing valve outlet passage; the first inlet passage connected to a first fluid line for a first fluid, and the second inlet passage connected to a second fluid line for a second fluid; an outflowing pipe, wherein one end of the outflowing pipe is connected to an outlet passage of the mixing valve; and a mode selection device, wherein the mode selection device is connected to the mixing valve; the mode selection device is operable to select an operation mode of the faucet, so as to selectively allow one or both of the first fluid line and the second fluid line to communicate with the mixing valve outlet passage. The faucet further comprises a mixing ratio adjustment device; the mixing ratio adjustment device is operable to adjust a mixing ratio of the first fluid and the second fluid; and the mixing ratio adjustment device and the mode selection device operate independently from each other.

In one embodiment, the mixing valve is further provided with an auxiliary inlet passage; the auxiliary inlet passage communicates with the first fluid line or the second fluid line, and the mode selection device is operable to selectively allow the auxiliary inlet passage to communicate with the mixing valve outlet passage.

The mixing valve comprises a valve seat, a fixed valve plate, and a movable valve plate. The valve seat is provided with a first inlet, a second inlet, and a valve seat outlet penetrating therethrough; and the valve seat is further provided with an auxiliary hole. The fixed valve plate is provided with a first channel, a second channel, a third channel, and an auxiliary channel penetrating therethrough; the fixed valve plate is securely mounted on the valve seat, allowing the first inlet, the second inlet, and the valve seat outlet of the valve seat to respectively communicate with the first channel, the second channel, and the third channel of the fixed valve plate, so that the first inlet passage comprises the first inlet and the first channel, the second inlet passage comprises the second inlet and the second channel, the mixing valve outlet passage comprises the valve seat outlet and the third channel, the auxiliary inlet passage comprises the auxiliary hole and the auxiliary channel. The movable valve plate is mounted onto the fixed valve plate, a joint face between the fixed valve plate and the movable valve plate is a sealing joint face; and the movable valve plate is provided with a recess part recessing from the sealing joint face. The mode selection device is connected to the movable valve plate, and the mode selection device is operable to allow the movable valve plate to rotate relative to the fixed valve plate, so that the recess part enables one or two of the first inlet passage, the second inlet passage, and the auxiliary inlet passage to communicate with the mixing valve outlet passage.

One or more of the first channel, the second channel, and the third channel of the fixed valve plate comprise a through hole part and a slot having a base, the through hole part penetrating the fixed valve plate and penetrating a part of the base of the slot.

In one embodiment, the mixing ratio adjustment device is operably provided within an adjustment hole of the valve seat. The valve seat is further provided with a plurality of auxiliary ports with different diameters; the mixing ratio adjustment device is operable to allow only one auxiliary port of the plurality of auxiliary ports to communicate with the auxiliary hole; and the remaining auxiliary ports of the plurality of auxiliary ports are all blocked by the mixing ratio adjustment device.

In one embodiment, the mixing ratio adjustment device is an adjustment bolt; the adjustment bolt is provided with an annular communication groove and a plurality of circumferential grooves spaced apart in an axial direction of the adjustment bolt; the annular communication groove forms a part of the auxiliary inlet passage, and the plurality of circumferential grooves respectively communicate with the annular communication groove. The adjustment bolt in the adjustment hole is adjustable to allow only one auxiliary port of the plurality of auxiliary ports to align to and communicate with a corresponding circumferential groove of the plurality of circumferential grooves.

In one embodiment, the adjustment bolt is rotatable relative to the valve seat in the adjustment hole, and the plurality of circumferential grooves are spaced apart and not overlapping in the circumferential direction of the adjustment bolt.

In one embodiment, the plurality of auxiliary ports extends from the adjustment hole to a lower surface of the valve seat, and the auxiliary hole extends from the adjustment hole to an upper surface of the valve seat.

The faucet further comprises an auxiliary port seal; the auxiliary port seal is provided with a plurality of through holes corresponding to the plurality of auxiliary ports; and the auxiliary port seal is provided within the adjustment hole so as to allow the plurality of auxiliary ports to be hermetically isolated from each other.

In one embodiment, the plurality of auxiliary ports comprises three auxiliary ports.

In one embodiment, the faucet is further provided with a mode selection indication device; the mode selection indication device is configured to generate indication information when the mode selection device selects an operation mode.

In another aspect of the present invention, a filtration system is provided; the filtration system comprising a filtration assembly for filtering a fluid and discharging a first fluid via a first fluid line and a second fluid via a second fluid line. The filtration system further comprises the faucet according to the present invention.

In one embodiment, the filtration system is a household water filter; the first fluid is mineral water, and the second fluid is purified water.

In the present invention, the mode selection device and the mixing ratio adjustment device of the faucet are configured to operate independently from each other, so that operation of the faucet and the filtration system having the faucet can be simplified; and the operation of the faucet can be better in line with operating habits of a user. In addition, in the faucet and the filtration system according to the present invention, only the mode selection device is used for driving the movable valve plate to rotate to allow one or both of the first fluid line and the second fluid line to communicate with the mixing valve outlet passage. Providing a separate switch valve for each line is therefore not needed. The number of parts and components are reduced, thereby achieving compactness and facilitating installation. In addition, the mixing ratio adjustment device is provided to form a plurality of different auxiliary inlet passages. As a result, a plurality of different mixing ratios can be provided and appropriate mixing ratios can be configured depending on the use environments, thereby expanding the application scope of the faucet and the filtration system having the faucet.

BRIEF DESCRIPTION OF THE DRAWINGS

The embodiments of the present invention are described below merely as examples with reference to the accompanying drawings. In the accompanying drawings, the same features or components are represented by the same reference numerals, and the accompanying drawings are not necessarily drawn to scale. Further, in the accompanying drawings:

FIG. 28 shows a parameter table of the curve graph in FIG. 27.

DETAILED DESCRIPTION

Figure 1:
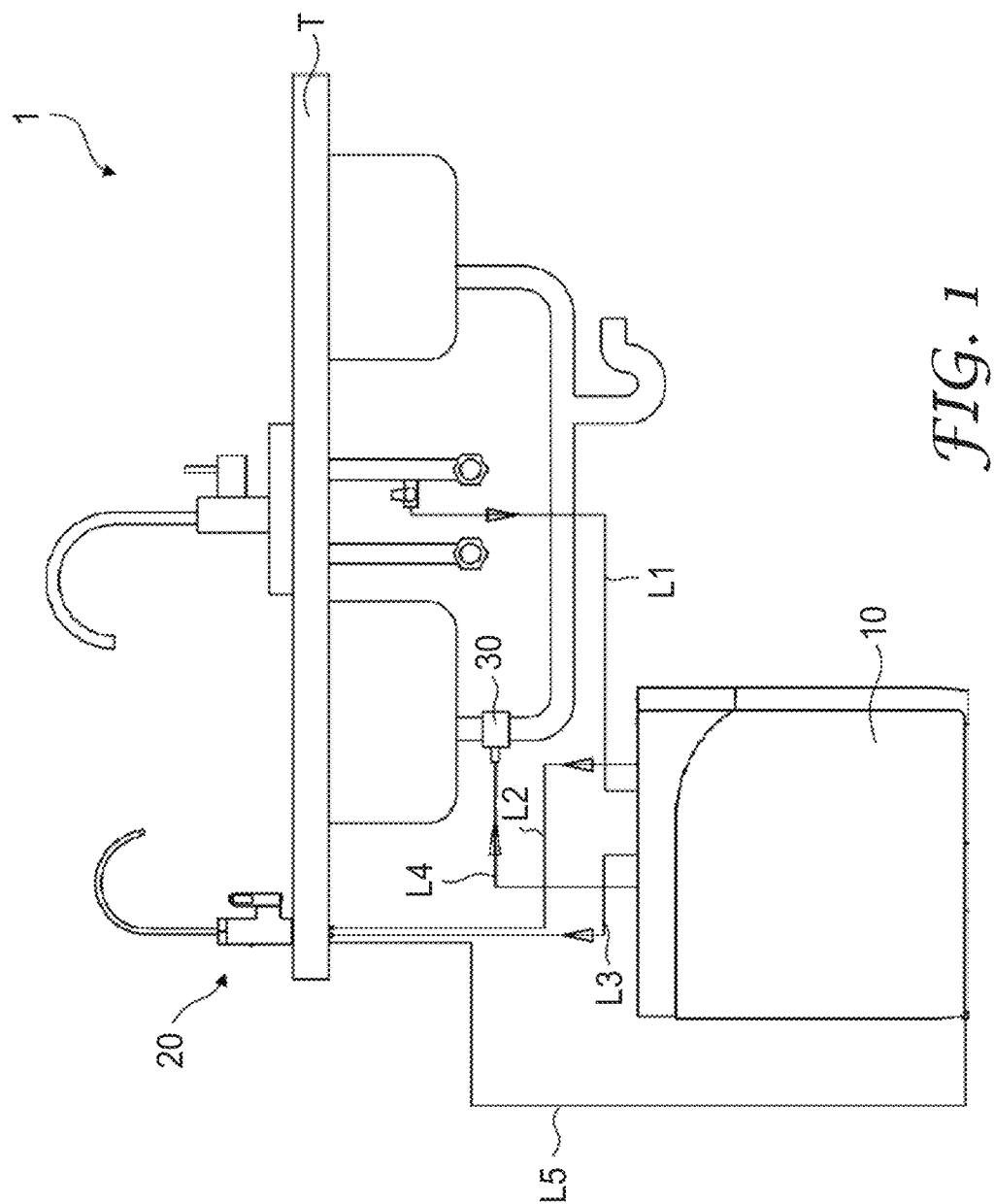
FIG. 1 is a schematic view of a municipal tap water filtration system having a faucet according to an embodiment of the present invention.

The following descriptions are substantially merely exemplary, and are not intended to limit the present invention, the application, and the use. It should be understood that in all of the accompanying drawings, similar reference numerals represent the same or similar parts and features. The accompanying drawings illustratively show the idea and principles of the embodiments of the present invention, but do not necessarily show specific sizes of each embodiment of the present invention and the scale thereof. In some parts of specific accompanying drawings, related details or structures of the embodiments of the present invention may be illustrated in an exaggerated manner.

In the descriptions of the embodiments of the present invention, the directional terms related to "up" and "down" are described according to the upper and lower positions in the views shown in the accompanying drawings. In an actual application, the "up" and "down" position relationships used in the present invention may be defined according to actual conditions, and these relationships can also be reversed.

The faucet according to the present invention can be used in a filtration system, and can also be used in another device to allow a selected fluid to be dispensed. The filtration system having a faucet according to the present invention can be used for filtering municipal tap water, and can also be used for filtering other fluids. The application of a faucet in a municipal tap water filtration system is used as an example. With reference to the accompanying drawings, the faucet and the filtration system according to the present invention are separately described below in combination with a household water filter.

FIG. 1 is a schematic view of a municipal tap water filtration system having a faucet according to an embodiment of the present invention. In this example, the municipal tap water filtration system is a household water filter 1. The household water filter 1 is an example of application of a filtration system having a faucet according to the present invention in a drinking water filtration system. As shown in FIG. 1, the household water filter 1 mainly comprises a filtration assembly 10 and a water faucet 20 (the faucet according to the present invention). The filtration assembly 10 is mounted below a countertop T (for example, a kitchen water sink countertop), and is provided with an activated carbon filter element (not shown) and a reverse osmosis membrane filter element (not shown) so as to filter raw water (for example, municipal tap water). The raw water enters the filtration assembly 10 by flowing through a raw water line L1. The water faucet 20 is mounted above the countertop T, and is connected to an outlet of the filtration assembly 10 by a corresponding pipeline. Mineral water (a first fluid) with minerals, which is obtained by means of filtration by the activated carbon filter element in the filtration assembly 10, flows from an outlet of the activated carbon filter element through a mineral water line (a first fluid line) L2 to a first inlet passage of the water faucet 20. Purified water (a second fluid) without minerals, which is obtained by means of filtration by the reverse osmosis membrane filter element in the filtration assembly 10, flows from an outlet of the reverse osmosis membrane filter element through a purified water line (a second fluid line) L3 to a second inlet passage of the water faucet 20. Therefore, in this example, the first inlet passage is a mineral water inlet passage, and the second inlet passage is a purified water inlet passage. In other examples according to the present invention, however, the first inlet passage can be configured to be a purified water inlet passage, and the second inlet passage can be configured to be a mineral water inlet passage. All waste water obtained after the raw water is filtered by the filtration assembly 10 flows from a waste water port of the filtration assembly 10 through a waste water line L4 to a drainage assembly 30, so as to directly discharge waste water, or the waste water can be reused for other household purposes, such as washing clothes or flushing toilets. In this example, the water faucet 20 of the household water filter 1 further comprises a display device (not shown). The display device is, for example, a liquid crystal display screen, and is used for displaying information related to a current operation mode of the water faucet 20. A cable L5 is connected between the filtration assembly 10 and the water faucet 20, so as to supply power to the display device.

Figure 3:
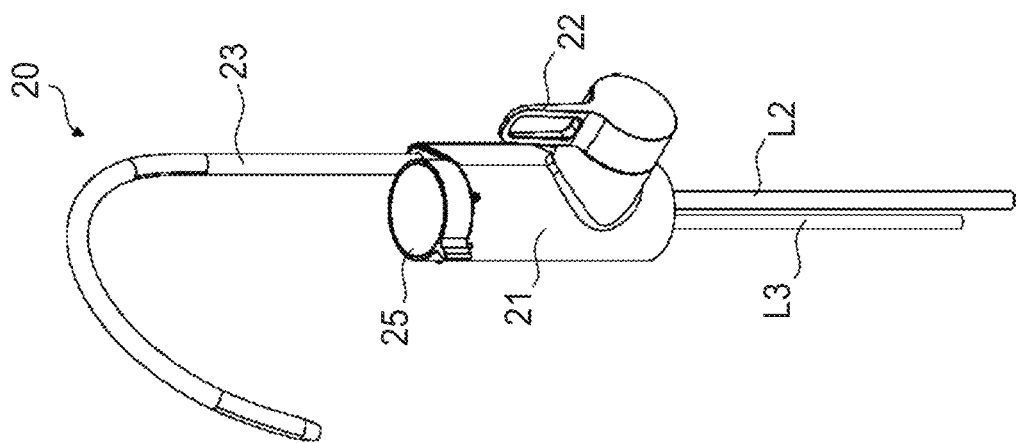
FIG. 2 and FIG. 3 are each a perspective view of the faucet of the municipal tap water filtration system in FIG. 1.
Figure 2:
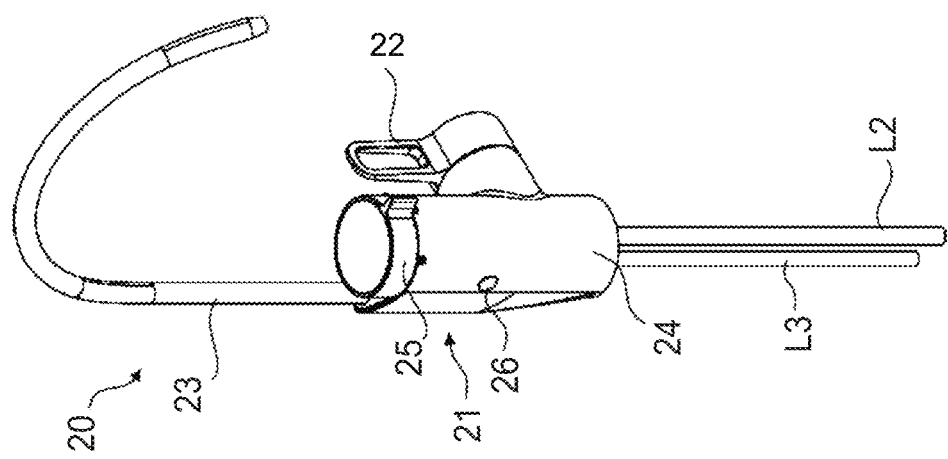

FIG. 2 and FIG. 3 are each a perspective view of the water faucet 20 of the household water filter 1. As shown in FIG. 2 and FIG. 3, the water faucet 20 comprises a mixing valve assembly 21, a switch handle 22, and an outlet pipe (outflowing pipe) 23. The mixing valve assembly 21 is provided with a first inlet passage, a second inlet passage, an auxiliary inlet passage, and a mixing valve outlet passage. The first inlet passage is connected to the mineral water line L2. The second inlet passage is connected to the purified water line L3. The auxiliary inlet passage is connected to the mineral water line L2 or the purified water line L3. The outlet pipe 23 is connected to the mixing valve outlet passage. In this example, the auxiliary inlet passage is connected to the mineral water line L2. Mineral water and purified water obtained by means of filtration by the filtration assembly 10 can selectively enter the mixing valve assembly 21 respectively through the mineral water line L2 and the purified water line L3. Moving the switch handle 22 can enable the outlet pipe 23 to communicate with the mixing valve outlet passage of the mixing valve assembly 21, so that water after purification (mineral water, purified water, or mixed water of mineral water and purified water) flows out of the outlet pipe 23 for use. The water faucet 20 has three operation modes: mineral water mode, purified water mode, and mixed water mode. In the mineral water mode, the first inlet passage and the auxiliary inlet passage communicate with the mixing valve outlet passage. When the switch handle 22 opens the water faucet to allow the outlet pipe 23 to communicate with the mixing valve outlet passage, mineral water can enter the mixing valve assembly 21 by flowing through the first inlet passage and the auxiliary inlet passage and flow through the mixing valve outlet passage to be dispensed from the outlet pipe 23. In the purified water mode, the second inlet passage communicates with the mixing valve outlet passage. When the switch handle 22 opens the water faucet 20 to allow the outlet pipe 23 to communicate with the mixing valve outlet passage, purified water enters the mixing valve by flowing through the second inlet passage, and flows through the mixing valve outlet passage to be dispensed from the outlet pipe 23. In the mixed water mode, the second inlet passage and the auxiliary inlet passage communicate with the mixing valve outlet passage. When the switch handle 22 opens the water faucet to allow the outlet pipe 23 to communicate with the mixing valve outlet passage, purified water enters the mixing valve by flowing through the second inlet passage; mineral water enters the mixing valve by flowing through the auxiliary inlet passage; and the purified water and the mineral water are mixed in the mixing valve assembly 21, and flow through the mixing valve outlet passage to be dispensed from the outlet pipe 23. In this case, water that is purified and dispensed from the outlet pipe is the mixed water formed by mineral water and purified water.

The mixing valve assembly 21 is provided with a mode selection device 25 and a mixing ratio adjustment window 26. The mode selection device 25 is mounted at an upper end of a housing 24 of the mixing valve assembly 21, and is used for selecting an operation mode of the water faucet 20. In this example, the mode selection device 25 is in the form of a selection knob. However, the present invention is not limited thereto. In other examples according to the present invention, the mode selection device 25 can also be in other forms. Adjusting the mode selection device 25 to a different position can select a corresponding operation mode of the water faucet 20 so as to select the water quality to be dispensed from the outlet pipe 23. For example, when the mode selection device 25 rotates to correspond to the mineral water mode, mineral water containing minerals is dispensed from the outlet pipe 23. The mixing ratio adjustment window 26 is provided on the housing 24 of the mixing valve assembly 21. By means of the mixing ratio adjustment window 26, the mixing ratio adjustment device used for adjusting a mixing ratio of purified water and mineral water can be accessed, thereby adjusting a mixing ratio of purified water and mineral water in the mixed water dispensed from the outlet pipe 23.

Figure 4:
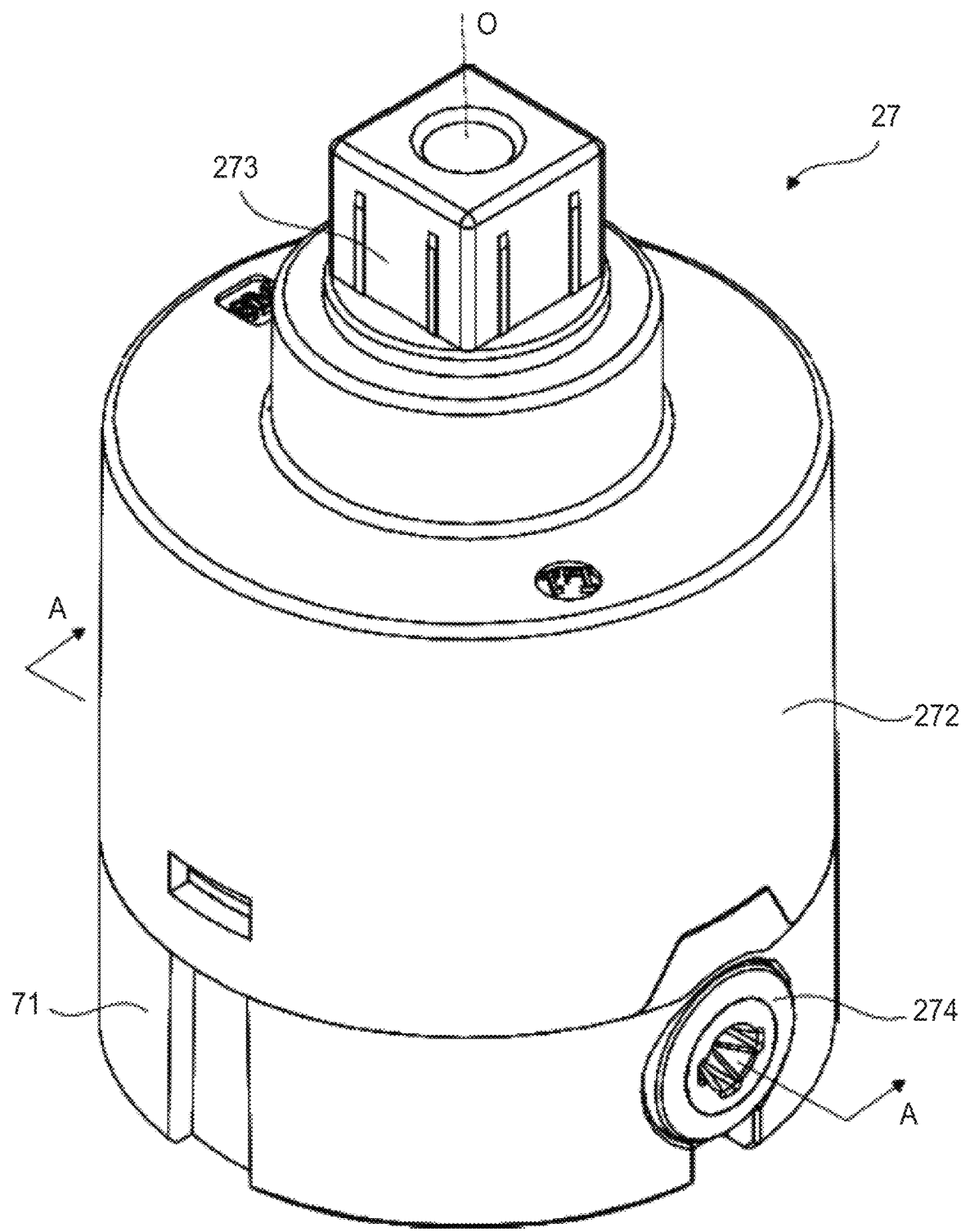
FIG. 4 and FIG. 5 are each a perspective view of a mixing valve of a mixing valve assembly in the faucet in FIG. 2 and FIG. 3.
Figure 5:
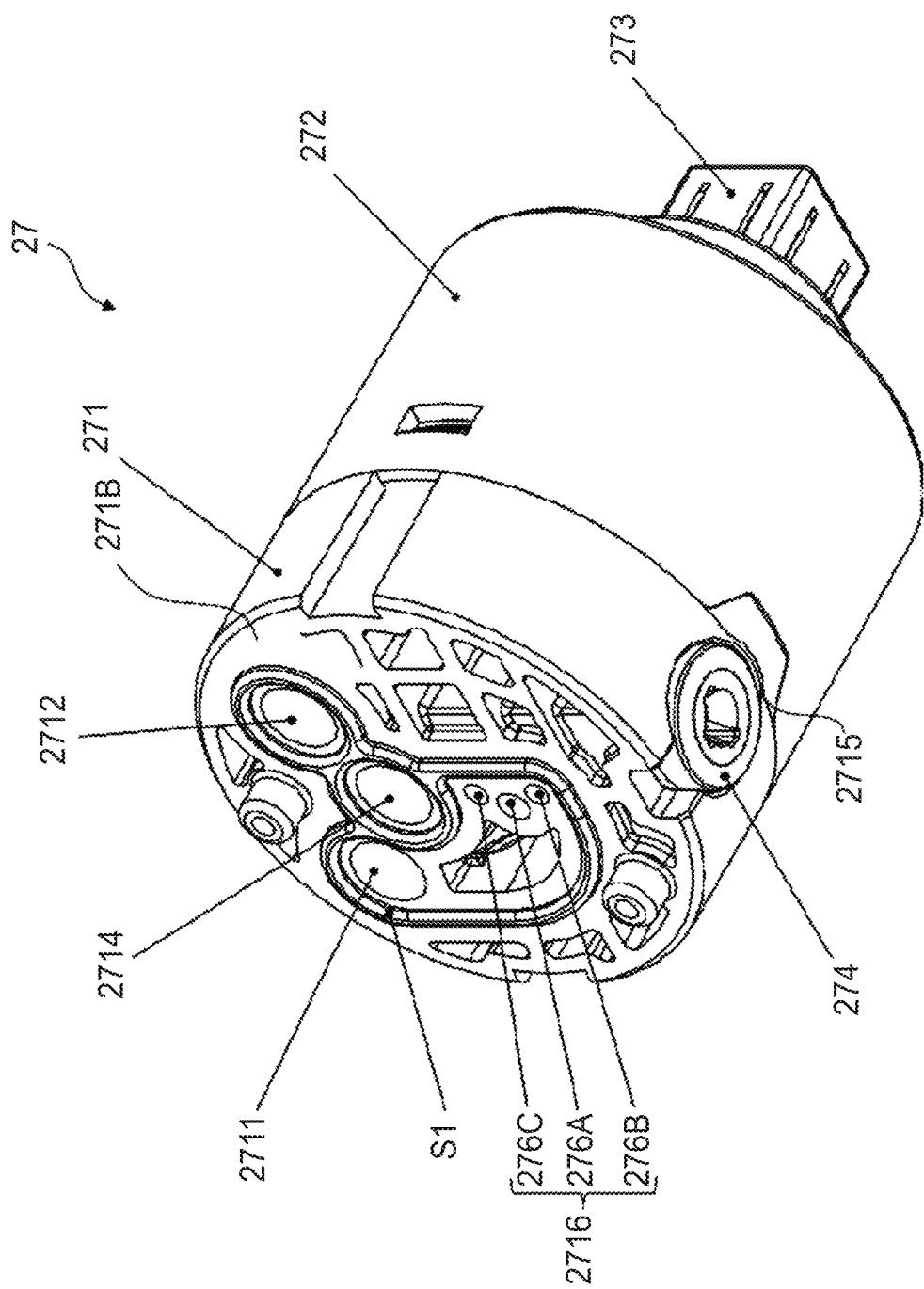
Figure 6:
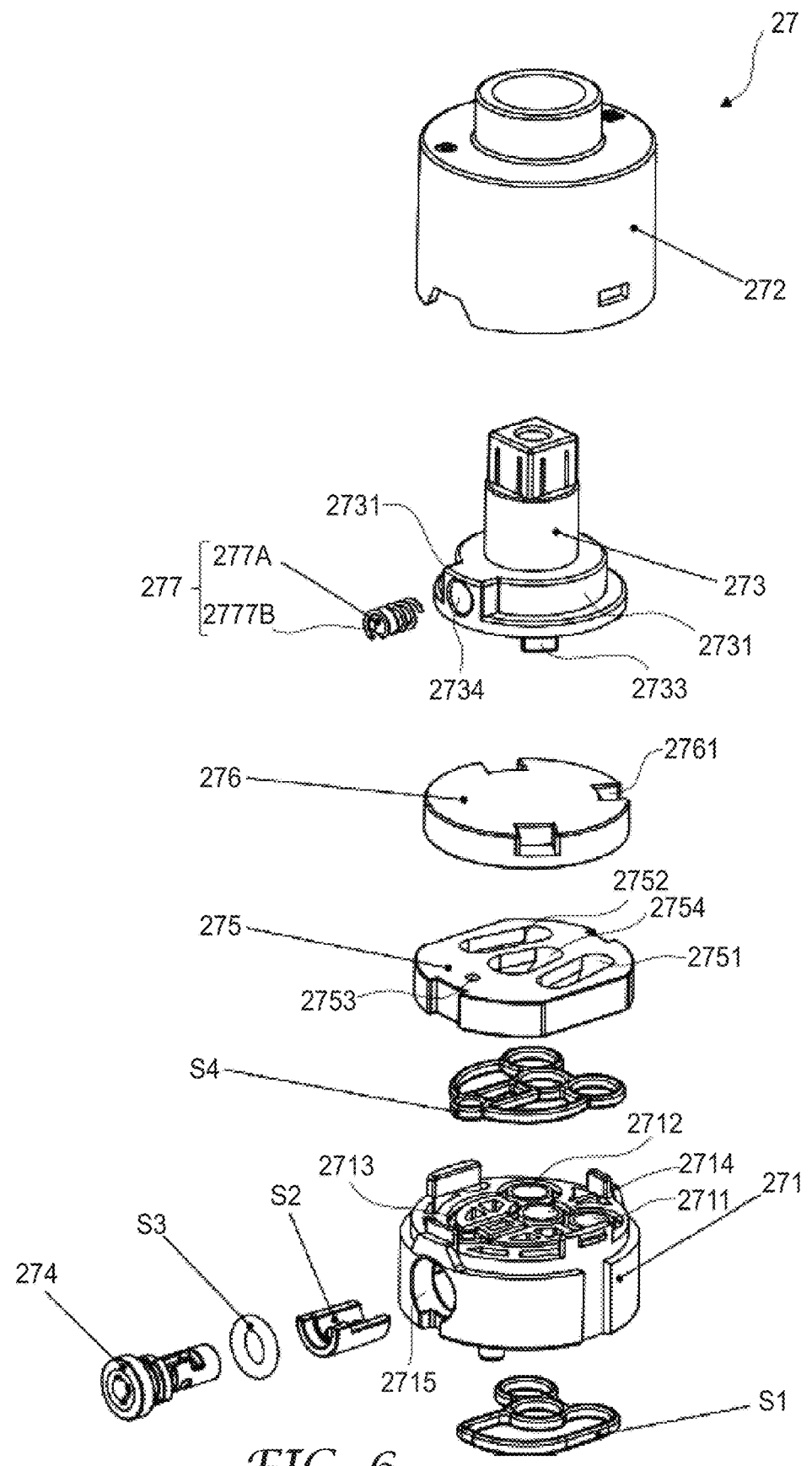
FIG. 6 is an exploded perspective view of the mixing valve in FIG. 4 and FIG. 5.

A mixing valve 27 is mounted in the housing 24 of the mixing valve assembly 21. FIG. 4 and FIG. 5 are each a perspective view of the mixing valve 27 mounted in the housing 24, and FIG. 6 is an exploded perspective view of the mixing valve 27. As shown in FIGS. 4, 5, and 6, the mixing valve 27 comprises a valve seat 271; and the valve seat 271 is mounted in the housing 24 via a first seal S1. The mixing ratio adjustment device is hermetically mounted in the valve seat 271. In this example, the mixing ratio adjustment device is an adjustment bolt 274. The adjustment bolt 274 is mounted within an adjustment hole 2715 of the valve seat 271 via a second seal and a third seal S3. The second seal is an auxiliary port seal S2. The mixing valve 27 is mounted in the housing 24 to allow the adjustment bolt 274 to align with the mixing ratio adjustment window 26 on the housing 24, so that the adjustment bolt 274 can be operated from the outside of the housing 24 by means of a tool, thereby adjusting the mixing ratio of purified water and mineral water in the mixed water. A valve core housing 272 is mounted on an upper part of the valve seat 271. A valve core rotation shaft 273 is partially mounted in the valve core housing 272. One end part with a rectangle cross section of the valve core rotation shaft 273 is exposed at the upper part of the valve core housing 272 so as to be connected to the mode selection device 25 (see FIG. 2 and FIG. 3). The other cylindrical portion of the valve core rotation shaft 273 is housed in the valve core housing 272. A fixed valve plate 275, a movable valve plate 276, and a mode selection indication device 277 are further mounted in the valve core housing 272. Components of the mixing valve 27 are described below with reference to the accompanying drawings.

Figure 7:
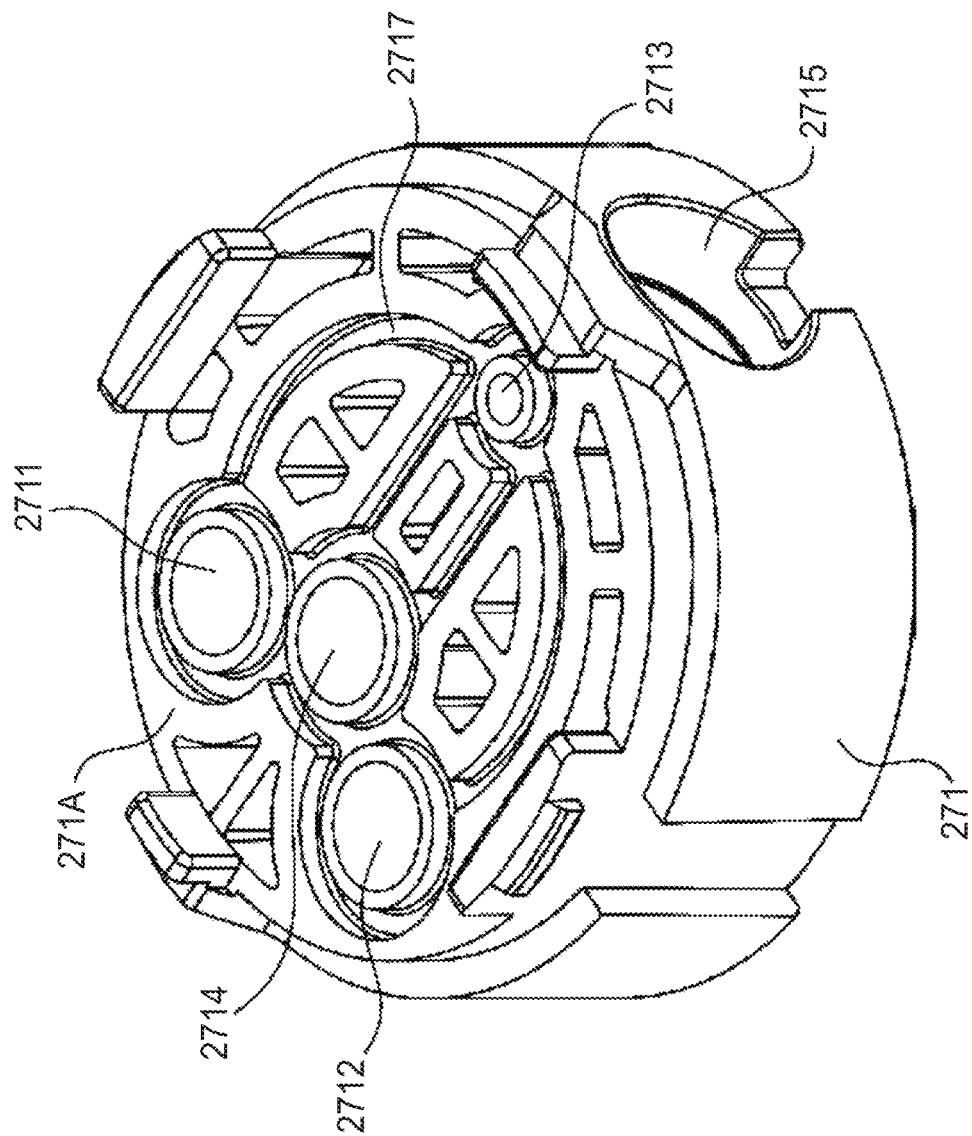
FIG. 7 is a perspective view of a valve seat of the mixing valve in FIG. 6.
Figure 8:
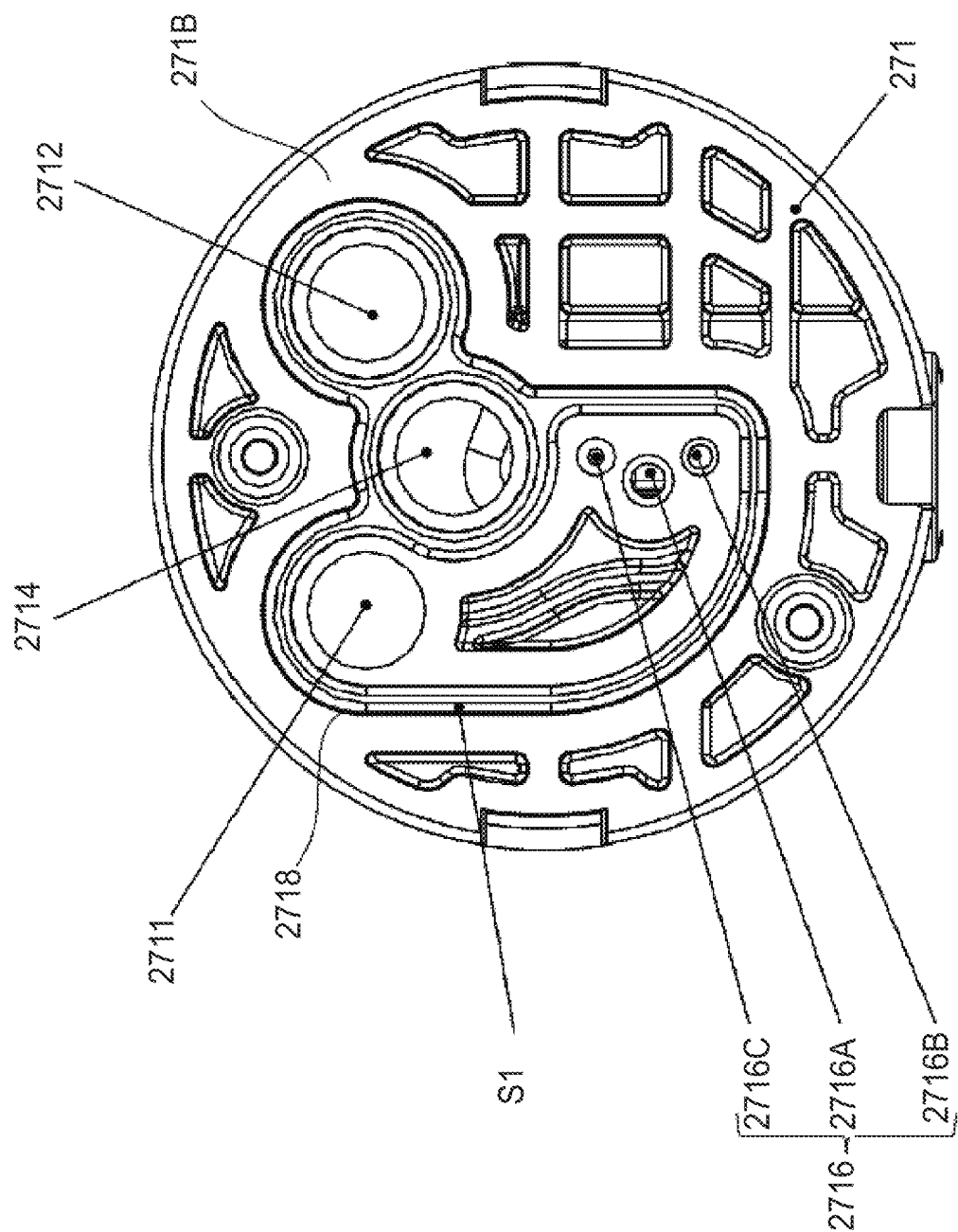
FIG. 8 is a bottom view of the valve seat of the mixing valve in FIG. 7.

FIG. 7 is a perspective view of the valve seat 271, and FIG. 8 is a bottom view of the valve seat 271. The valve seat 271 is provided with a first inlet 2711, a second inlet 2712, an auxiliary hole 2713, and a valve seat outlet 2714. The first inlet 2711, the second inlet 2712, and the valve seat outlet 2714 extend from an upper surface 271A of the valve seat 271 to a lower surface 271B of the valve seat 271, so as to penetrate the valve seat 271 vertically. The first inlet 2711 is connected to the mineral water line L2. The second inlet 2712 is connected to the purified water line L3. The valve seat outlet 2714 is connected to the outlet pipe 23. In this example, the first inlet 2711 has substantially the same diameter as that of the second inlet 2712. However, the present invention is not limited thereto. In other examples according to the present invention, the first inlet 2711 and the second inlet 2712 can also be configured to have different diameters. For example, the diameter of the first inlet 2711 can be configured to be in the range of 2-7 millimeters; the diameter of the second inlet 2712 can be configured to be in the range of 3-10 millimeters; and the diameter of the valve seat outlet 2714 can be configured to be in the range of 5-10 millimeters. The diameter of the auxiliary hole 2713 is less than that of the first inlet 2711, of the second inlet 2712, and of the valve seat outlet 2714. The auxiliary hole 2713 extends from the upper surface 271A of the valve seat 271 to the adjustment hole 2715 that extends from a side surface of the valve seat 271 to the interior of the valve seat 271, but does not penetrate the valve seat 271 vertically. In addition, as shown in FIG. 8, the lower surface 271B of the valve seat 271 is provided with auxiliary ports 2716. The auxiliary ports 2716 comprise three auxiliary ports with different diameters, namely, a first auxiliary port 2716A, a second auxiliary port 2716B, and a third auxiliary port 2716C. The first auxiliary port 2716A, the second auxiliary port 2716B, and the third auxiliary port 2716C extend from the lower surface 271B of the valve seat 271 to the adjustment hole 2715 of the valve seat 271, but do not penetrate the whole valve seat 271 vertically. The first auxiliary port 2716A, the second auxiliary port 2716B, and the third auxiliary port 2716C are all connected to the mineral water line L2. The adjustment hole 2715 of the valve seat 271 extends horizontally from the side surface of the valve seat to the interior of the valve seat 271, but does not penetrate the valve seat 271 horizontally. For example, the adjustment hole 2715 can extend radially from the side surface of the valve seat 271 to the interior of the valve seat 271, and can be located below the auxiliary hole 2713 and above the auxiliary ports 2716. The adjustment bolt 274 in the adjustment hole 2715 is operable to selectively allow only one of the first auxiliary port 2716A, the second auxiliary port 2716B, and the third auxiliary port 2716C to communicate with the auxiliary hole 2713. The lower surface 271B of the valve seat 271 is provided with a first installation slot 2718 for installing the first seal S1. The first seal S1 is used on the lower surface 271B of the valve seat 271 to allow both the first inlet 2711 and the auxiliary ports 2716 to be hermetically spaced apart from the second inlet 2712 and the valve seat outlet 2714, and to hermetically install the valve seat 271 in the housing 24 of the mixing valve assembly 21. The upper surface 271A of the valve seat 271 is provided with a second installation slot 2717 for installing a fourth seal S4. The fourth seal S4 is used on the upper surface 271A of the valve seat 271 to allow the first inlet 2711, the second inlet 2712, the auxiliary hole 2713, and the valve seat outlet 2714 to be hermetically spaced apart from each other, and to achieve hermetic installation between the fixed valve plate 275 and the valve seat 271. In this example, the first seal S1 and the fourth seal S4 are both one-piece seals. However, the present invention is not limited thereto. In other examples according to the present invention, the first seal S1 and/or the fourth seal S4 can be a seal assembly formed by a plurality of separate seals.

The first inlet 2711 and the auxiliary ports 2716 are both connected to the mineral water line L2. Mineral water obtained by means of filtration of the filtration assembly 10 can enter the first inlet 2711 and the auxiliary ports 2716 by flowing through the mineral water line L2, and enter the auxiliary hole 2713 by flowing through one of the first auxiliary port 2716A, the second auxiliary port 2716B, and the third auxiliary port 2716C. The second inlet 2712 is connected to the purified water line L3. Purified water obtained by means of filtration of the filtration assembly 10 can enter the second inlet 2712 by flowing through the purified water line L3. The valve seat outlet 2714 selectively communicates with one or two of the first inlet 2711, the second inlet 2712, and the auxiliary hole 2713, and is connected to one end of the outlet pipe 23 of the water faucet 20 (see FIG. 2 and FIG. 3), thereby dispensing selected and purified water from the outlet pipe 23 for use.

Figure 9:
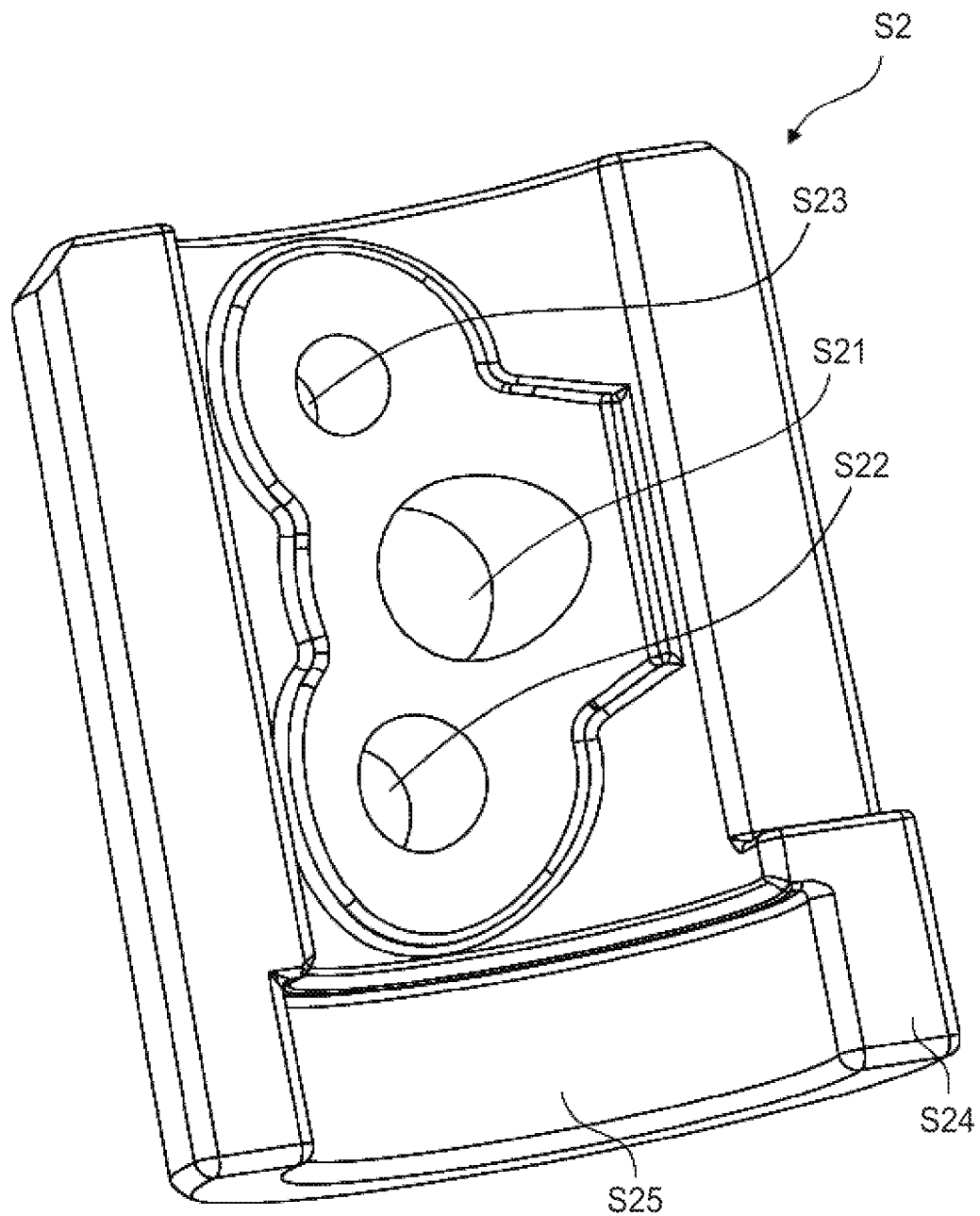
FIG. 9 is a perspective view of an auxiliary port seal of the mixing valve in FIG. 6.

FIG. 9 is a perspective view of the auxiliary port seal S2 mounted in the adjustment hole 2715. As shown in FIG. 9, the auxiliary port seal S2 is curved, and has an outer contour substantially corresponding to a part of a contour of the adjustment hole 2715 of the valve seat 271. The auxiliary port seal S2 is provided with three through holes with different diameters, namely, a first through hole S21, a second through hole S22, and a third through hole S23. One end part S24 of the auxiliary port seal S2 is provided with a curved fitting surface S25. When the auxiliary port seal S2 is mounted in position in the adjustment hole 2715 of the valve seat 271, the end part S24 is located radially outside, and the first through hole S21, the second through hole S22, and the third through hole S23 respectively align with the first auxiliary port 2716A, the second auxiliary port 2716B, and the third auxiliary port 2716C of the valve seat 271, which in turn enables the first auxiliary port 2716A, the second auxiliary port 2716B, and the third auxiliary port 2716C to be hermetically spaced apart. Preferably, the diameters of the first through hole S21, the second through hole S22, and the third through hole S23 are the same as respective diameters of the first auxiliary port 2716A, the second auxiliary port 2716B, and the third auxiliary port 2716C of the valve seat 271.

Figure 10:
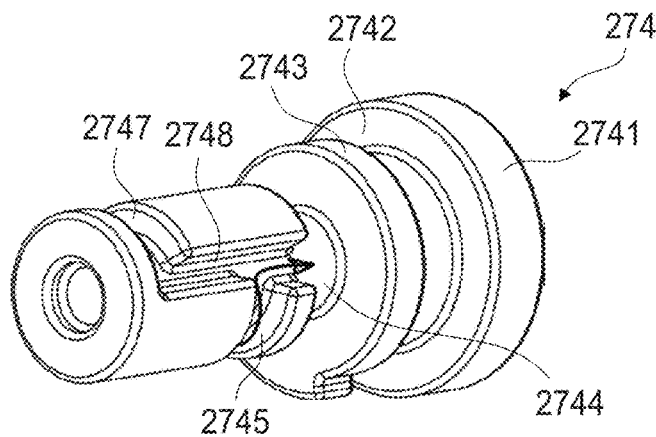
FIG. 10 to FIG. 12 are each a perspective view of a mixing ratio adjustment device of the mixing valve in FIG. 6.
Figure 11:
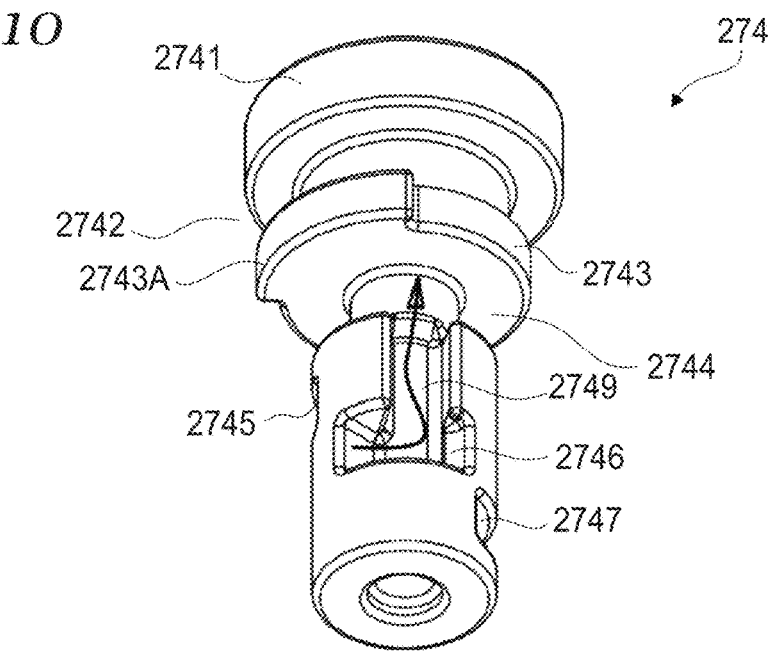
Figure 12:
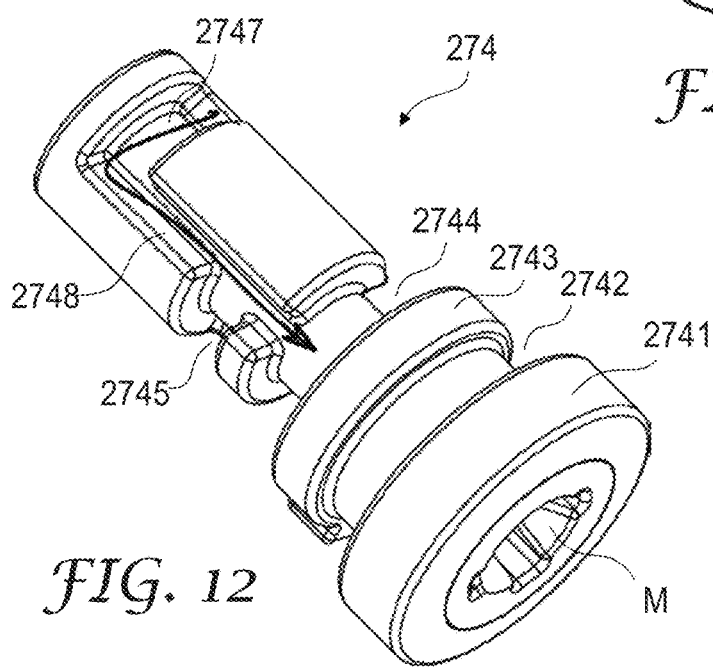

FIG. 10 to FIG. 12 are each a perspective view of the adjustment bolt 274 mounted in the adjustment hole 2715. The adjustment bolt 274 comprises a first annular flange 2741 and a second annular flange 2743. The first annular flange 2741 is located at an end part of the adjustment bolt 274, and is provided with a fitting hole M having an engagement feature. The fitting hole M is adapted to engage with an operating tool (not shown) to operate the adjustment bolt 274. The first annular flange 2741 and the second annular flange 2743 are spaced apart in an axial direction of the adjustment bolt 274 so as to form a first annular groove 2742 therebetween, and the third seal S3 (see FIG. 6) can be mounted in the first annular groove 2742. A curved protruding stopping part 2743A is formed on an outer periphery of the second annular flange 2743. An annular communication groove 2744 is further formed between the second annular flange 2743 and the rest of the adjustment bolt 274. On one side of the second annular flange 2743 (the left side in FIG. 10), a rod part of the adjustment bolt 274 is provided with three circumferential grooves spaced apart in the axial direction of the adjustment bolt 274, which are, in ascending order of distances to the second annular flange 2743, a first circumferential groove 2745, a second circumferential groove 2746, and a third circumferential groove 2747. The first circumferential groove 2745, the second circumferential groove 2746, and the third circumferential groove 2747 are spaced apart in both the axial direction and a circumferential direction of the adjustment bolt 274, and respectively communicate with the annular communication groove 2744 via corresponding axial grooves. For example, as shown in FIG. 10 and FIG. 12, the first circumferential groove 2745 and the third circumferential groove 2747 both communicate with the annular communication groove 2744 via a first axial groove 2748, and the second circumferential groove 2746 communicates with the annular communication groove 2744 via a second axial groove 2749, as shown in FIG. 11. The first circumferential groove 2745, the second circumferential groove 2746, and the third circumferential groove 2747 extend on a part of the circumferential direction of the adjustment bolt, namely, extending circumferentially by less than 360 degrees. In this example, the first circumferential groove 2745, the second circumferential groove 2746, and the third circumferential groove 2747 are configured not to overlap with each other in the circumferential direction of the adjustment bolt 274, and are each configured to extend in the circumferential direction of the adjustment bolt 274 by less than 120 degrees.

Figure 24:
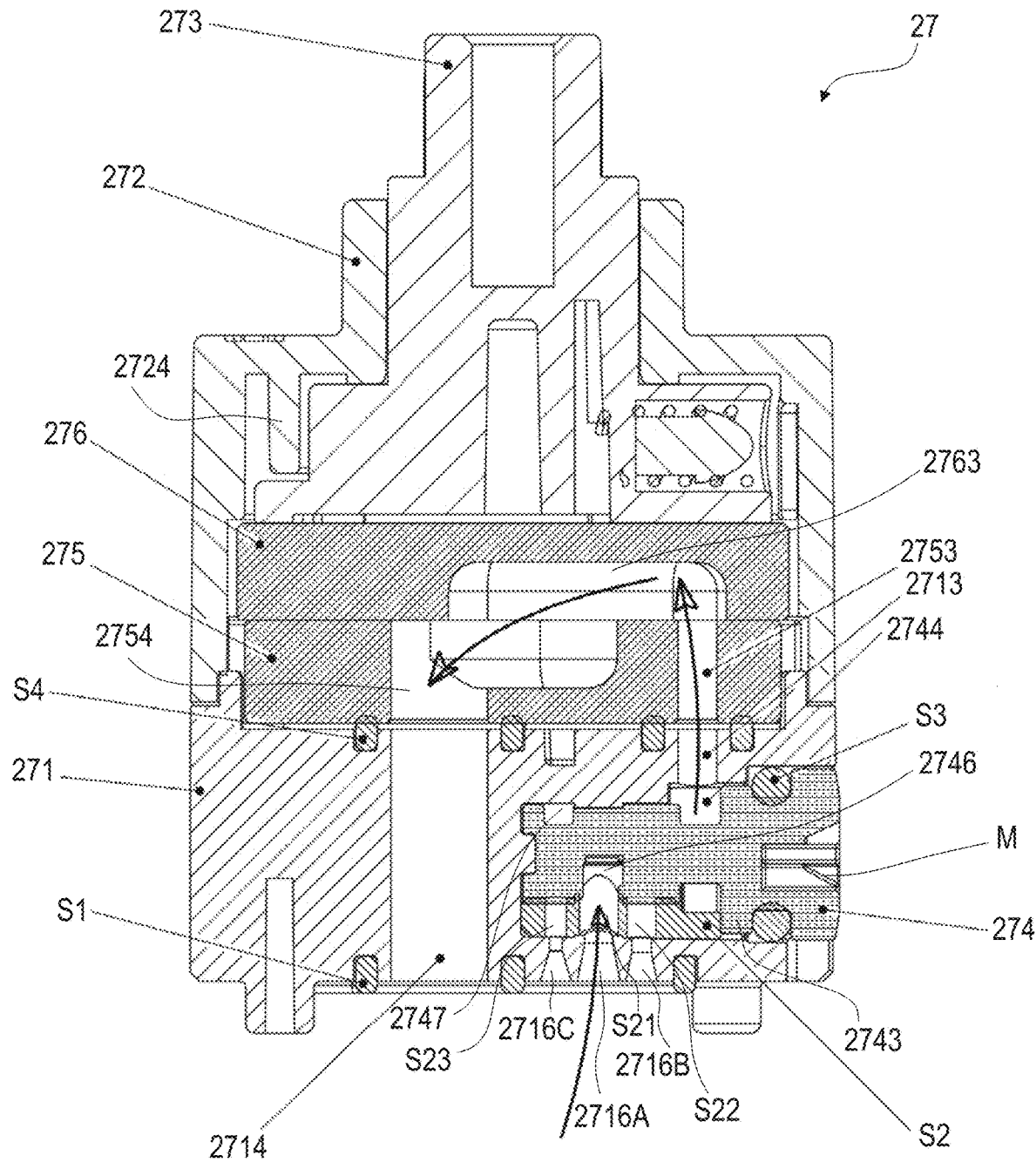
FIG. 24 to FIG. 26 are each a cross-sectional view parallel to a central axis of a mixing valve and taken along the cross-sectional line A-A in FIG. 4.
Figure 25:
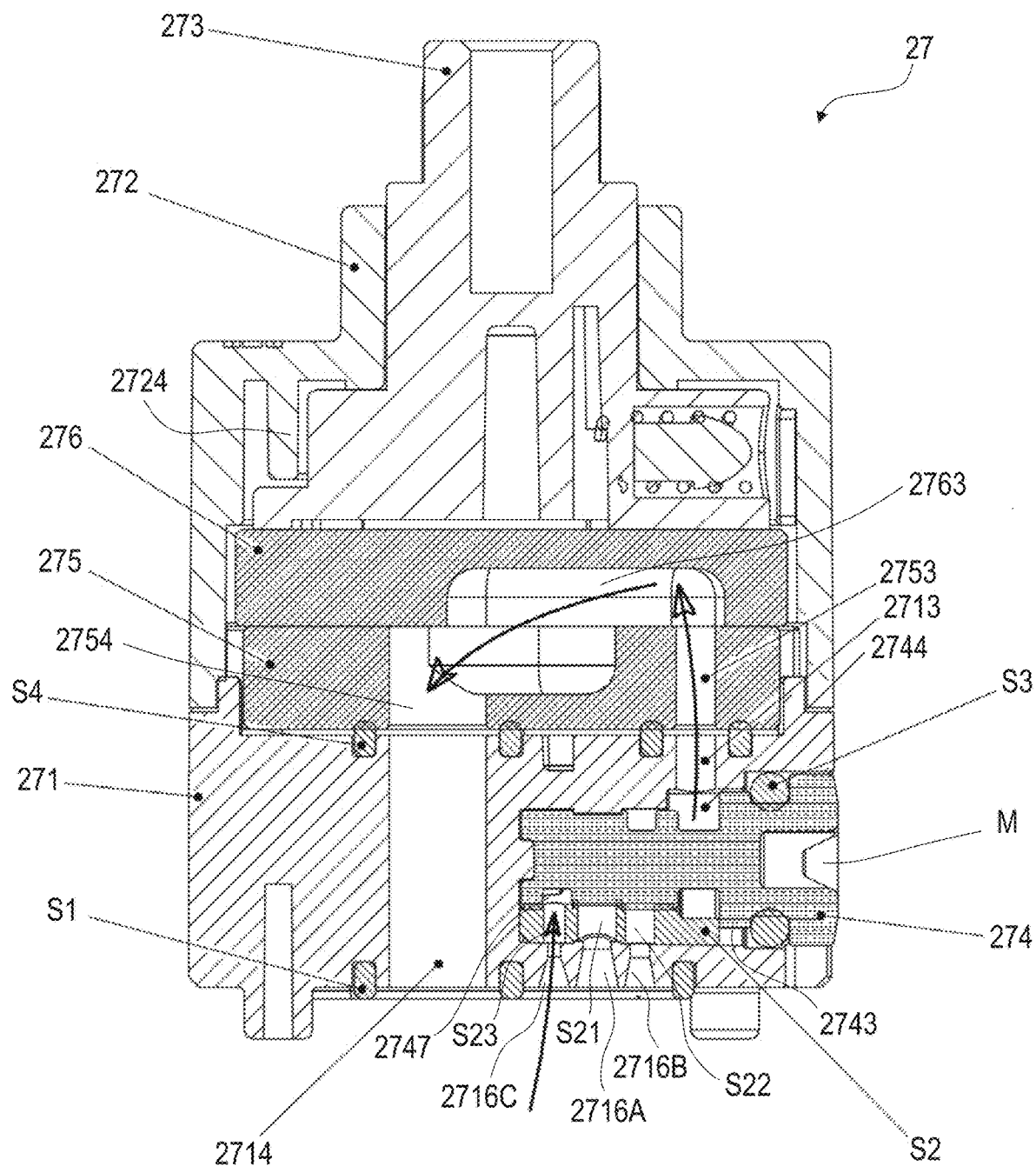
Figure 26:
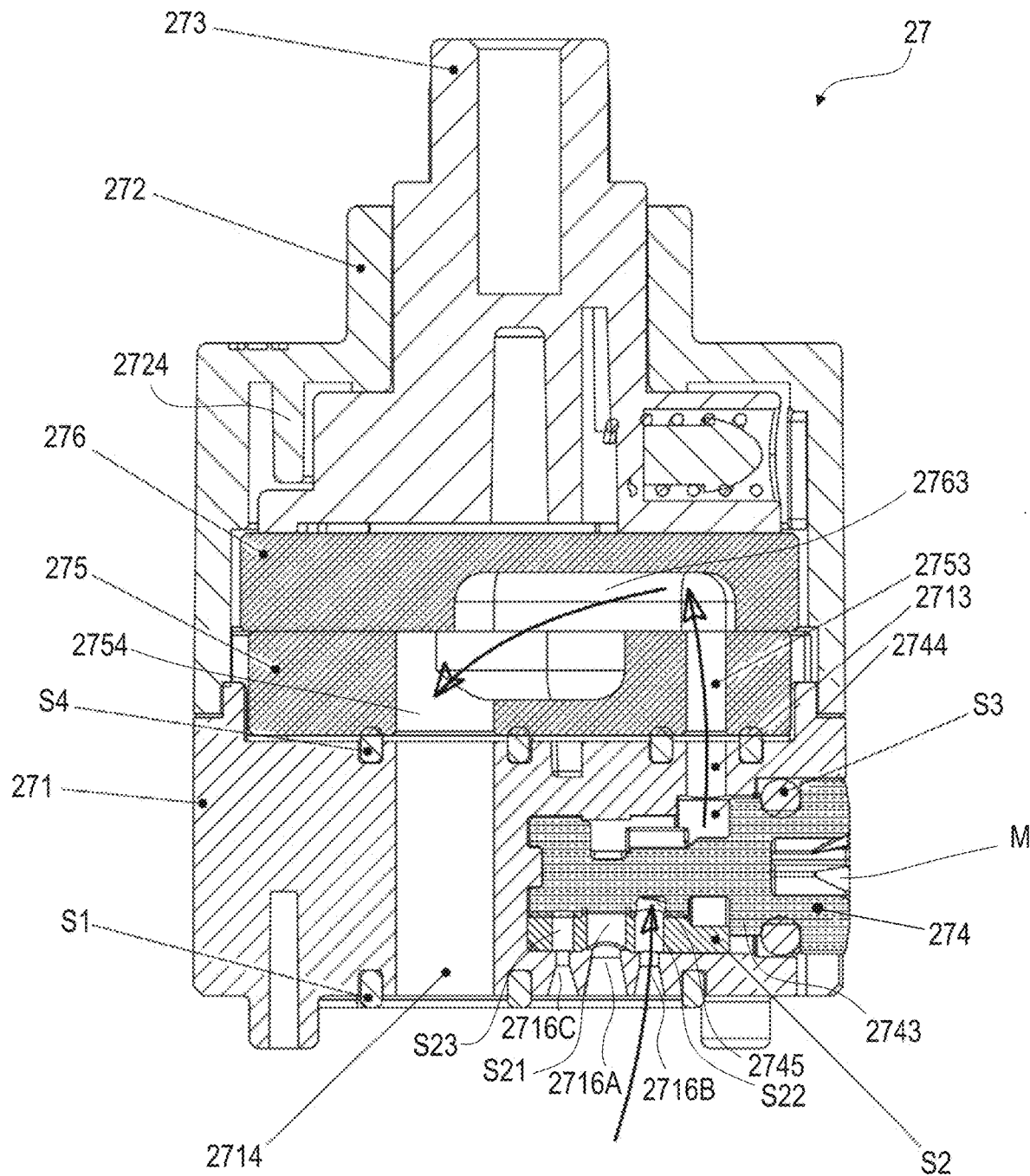

The adjustment bolt 274 is hermetically mounted in the adjustment hole 2715 of the valve seat 271 via the auxiliary port seal S2 and the third seal S3 (see FIG. 6) (the cross-sectional views in FIGS. 24, 25, and 26 show that the adjustment bolt 274, the auxiliary port seal S2, and the third seal S3 are mounted in position in the adjustment hole 2715 of the valve seat 271). The third seal S3 is in the font) of a seal ring, and is mounted in the first annular groove 2742. When the adjustment bolt 274 is hermetically mounted in the adjustment hole 2715 of the valve seat 271 via the auxiliary port seal S2 and the third seal S3, the curved fitting surface S25 of the end part S24 of the auxiliary port seal S2 abuts the second annular flange 2743 of the adjustment bolt 274, and the annular communication groove 2744 of the adjustment bolt 274 aligns with the auxiliary hole 2713 of the valve seat 271. The adjustment bolt 274 is rotatable relative to the auxiliary port seal S2 and the valve seat 271. When the adjustment bolt 274 rotates relative to the valve seat 271, the annular communication groove 2744 remains aligned with the auxiliary hole 2713 of the valve seat 271, and one of the first circumferential groove 2745, the second circumferential groove 2746, and the third circumferential groove 2747 selectively aligns with a corresponding one of the first auxiliary port 2716A, the second auxiliary port 2716B, and the third auxiliary port 2716C of the valve seat 271. In this way, one of the first auxiliary port 2716A, the second auxiliary port 2716B, and the third auxiliary port 2716C communicates with the auxiliary hole 2713, so as to adjust the amount of mineral water flowing through the auxiliary hole 2713 and adjust a mixing ratio of mineral water and purified water accordingly. Two circumferential end parts of the protruding stopping part 2743A (see FIG. 11) on the second annular flange 2743 are adapted to selectively engage with a fitting part (not shown) in the valve seat 271 so as to define a range within which the adjustment bolt 274 rotates relative to the auxiliary port seal S2 and the valve seat 271, thereby preventing the adjustment bolt 274 from rotating excessively.

Figure 13:
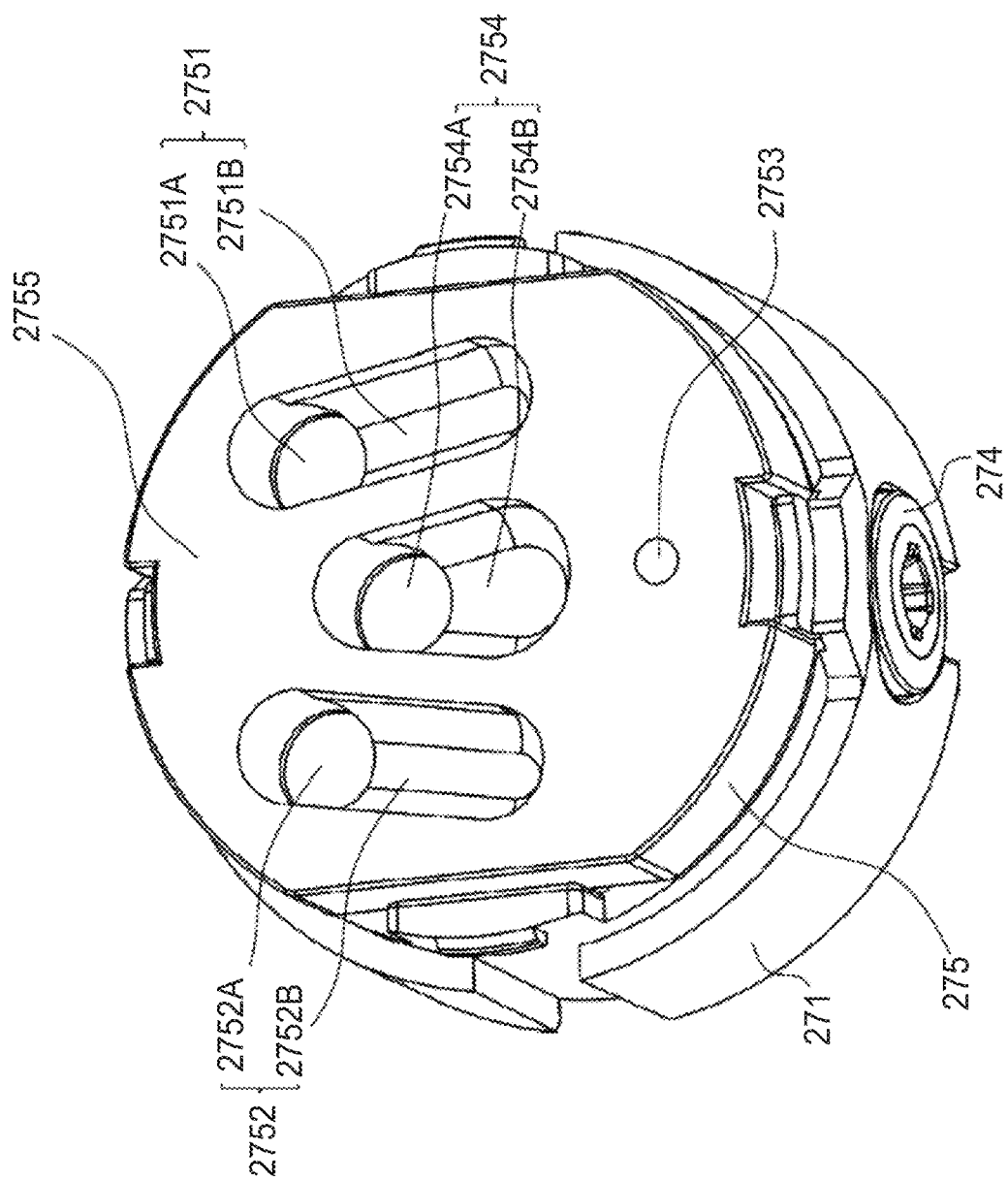
FIG. 13 is a perspective view of the valve seat and the fixed valve plate in FIG. 6 that are mounted together.

FIG. 13 is a perspective view of the fixed valve plate 275 hermetically mounted on the valve seat 271 via the fourth seal S4 (not shown in FIG. 13). An upper surface 2755 of the fixed valve plate 275 is a frictional surface, and is provided with a first channel 2751, a second channel 2752, a third channel 2754, and an auxiliary channel 2753. The first channel 2751 has a through hole part 2751A and a slot with a base 2751B. The through hole part 2751A penetrates the fixed valve plate 275, and penetrates a part of the base of the slot 2751B. The slot with a base 2751B recesses from the upper surface 2755 of the fixed valve plate 275, but does not penetrate the fixed valve plate 275. The second channel 2752 has a through hole part 2752A and a slot with a base 2752B. The through hole part 2752A penetrates the fixed valve plate 275, and penetrates a part of the base of the slot 2752B. The slot with a base 2752B recesses from the upper surface 2755 of the fixed valve plate 275, but does not penetrate the fixed valve plate 275. The third channel 2754 has a through hole part 2754A and a slot with a base 2754B. The through hole part 2754A penetrates the fixed valve plate 275, and penetrates a part of the base of the slot 2754B. The slot with a base 2754B recesses from the upper surface 2755 of the fixed valve plate 275, but does not penetrate the fixed valve plate 275. The auxiliary channel 2753 is a through hole penetrating the fixed valve plate 275. The fixed valve plate 275 is securely and hermetically mounted on the upper surface 271A of the valve seat 271 via the fourth seal S4 (see FIG. 6), so that the through hole part 2751A of the first channel 2751, the through hole part 2752A of the second channel 2752, the through hole part 2754A of the third channel 2754, and the auxiliary channel 2753 respectively align and communicate with the first inlet 2711, the second inlet 2712, the valve seat outlet 2714, and the auxiliary hole 2713 of the valve seat 271 (see FIG. 6). In the mixing valve 27, the first inlet passage comprises the first inlet 2711 on the valve seat 271 and the first channel 2751 on the fixed valve plate 275; the second inlet passage comprises the second inlet 2712 on the valve seat 271 and the second channel 2752 on the fixed valve plate 275; the auxiliary inlet passage comprises one of the first auxiliary port 2716A, the second auxiliary port 2716B, and the third auxiliary port 2716C, the auxiliary hole 2713, and the auxiliary channel 2753; the mixing valve outlet passage comprises the valve seat outlet 2714 on the valve seat 271 and the third channel 2754 on the fixed valve plate 275. The first channel 2751, the second channel 2752, and the third channel 2754 are each provided with the slot with a base, thereby facilitating communication among the first inlet passage, the second inlet passage, and the mixing valve outlet passage.

Figure 14:
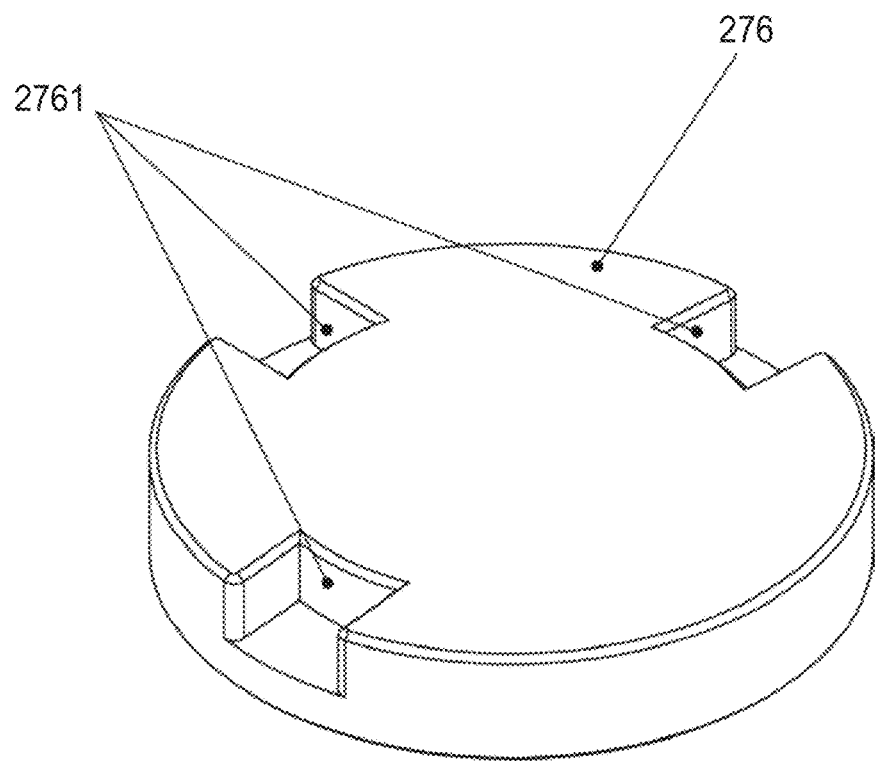
FIG. 14 and FIG. 15 are each a perspective view of the movable valve plate in FIG. 6.
Figure 15:
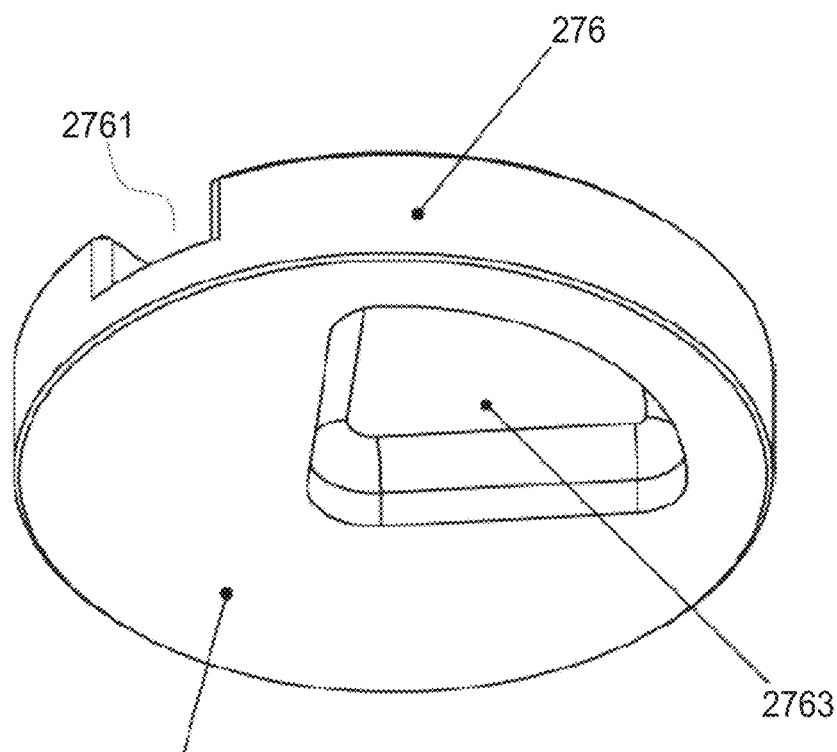

FIG. 14 and FIG. 15 are each a perspective view of the movable valve plate 276. An outer periphery of an upper surface of the movable valve plate 276 is provided with a plurality of fitting grooves 2761, and the fitting grooves 2761 are used for engaging with a driving force transmission part 2733 (see FIG. 6) of the rotation shaft 273 for receiving a driving force. A lower surface 2762 of the movable valve plate 276 is a frictional surface, and is provided with a recess part recessing from the frictional surface. In this example, the recess part is a fan-shaped groove 2763. The fan-shaped groove 2763 is a groove with a base, and recesses from the lower surface 2762 of the movable valve plate 276, but does not penetrates the movable valve plate 276 in a vertical direction thereof. The movable valve plate 276 is mounted on the fixed valve plate 275 in a manner that enables the movable valve plate 276 to rotate relative to the fixed valve plate 275. The lower surface 2762 of the movable valve plate 276 and the upper surface 2755 of the fixed valve plate 275 form a tight fit, and a sealing joint face is formed therebetween. Under the action of the driving force transmitted by the rotation shaft 273, the movable valve plate 276 can rotate relative to the fixed valve plate 275, so that the third channel 2754 on the fixed valve plate 275 selectively communicates with one or two of the first channel 2751, the second channel 2752, and the auxiliary channel 2753, thereby allowing the mixing valve outlet passage to selectively communicate with one or two of the first inlet passage, the second inlet passage, and the auxiliary inlet passage. During rotation of the movable valve plate 276 relative to the fixed valve plate 275, the fan-shaped groove 2763 remains facing at least a part of the third channel 2754, so that the third channel 2754 is not blocked by the movable valve plate 276 at any time. In this example, a part of the third channel 2754 is located in the center of the fixed valve plate 275; and accordingly, the fan-shaped groove 2763 extends from the center of the movable valve plate 276 towards the periphery. A fan angle of the fan-shaped groove 2763 can be configured according to positions of the channels and the auxiliary channel on the fixed valve plate, so that the fan-shaped groove 2763 can face any one of the first channel 2751, the second channel 2752, and the auxiliary channel 2753, and can face at least a part of two of the first channel 2751, the second channel 2752, and the auxiliary channel 2753.

In this example, the fixed valve plate 275 is a fixed ceramic plate having a frictional surface, and the movable valve plate 276 is a movable ceramic plate having a frictional surface thereon. The frictional surface of the fixed ceramic plate is joined to the frictional surface of the movable ceramic plate, so as to form the sealing joint face. However, in other embodiments according to the present invention, the fixed valve plate and the movable valve plate can also be valve plates in other forms.

Figure 16:
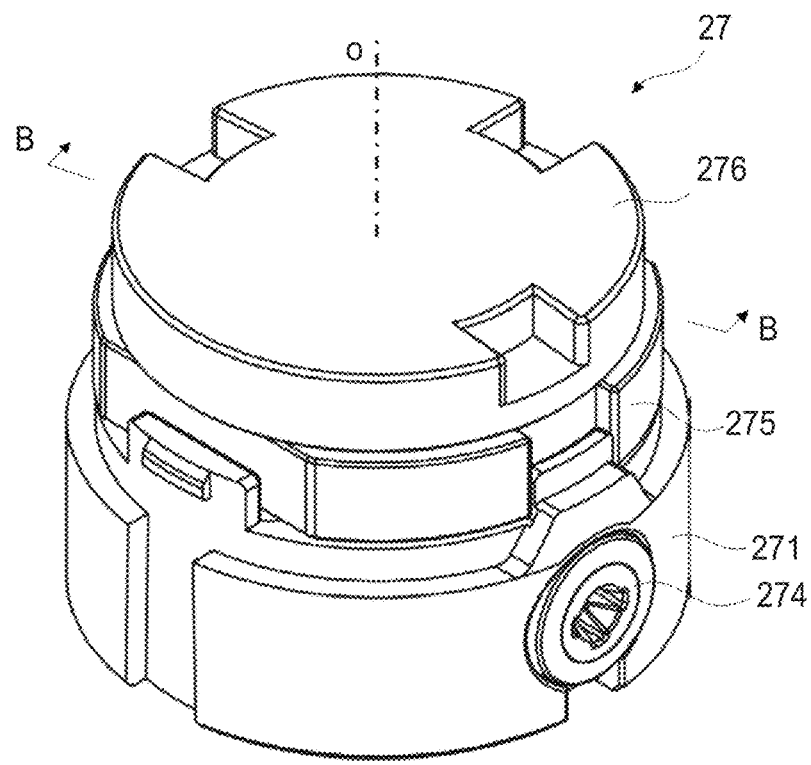
FIG. 16 is a perspective view of the valve seat, the fixed valve plate, and the movable valve plate in FIG. 6 that are mounted together.
Figure 17:
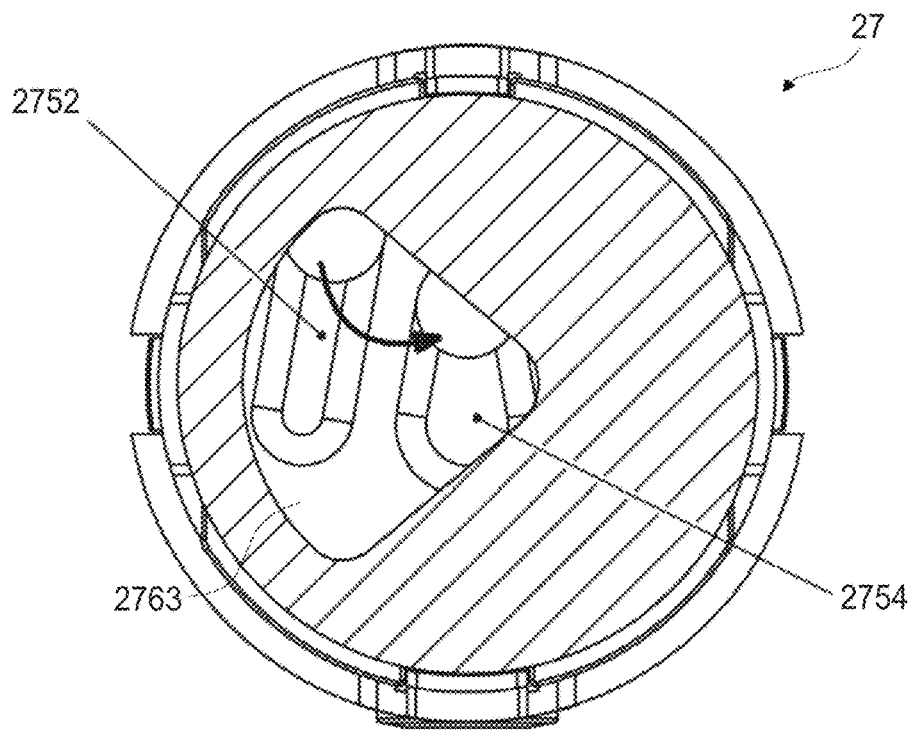
FIG. 17 is a cross-sectional view perpendicular to a central axis of a mixing valve and taken along the cross-sectional line B-B in FIG. 16.

FIG. 16, which is a perspective view of the movable valve plate 276, the fixed valve plate 275, and the valve seat 271 that are hermetically mounted together, shows the status of the mixing valve assembly 21 in the purified water mode. FIG. 17 is a cross-sectional view perpendicular to a central axis O of the mixing valve 27 and taken along the cross-sectional line B-B in FIG. 16, and shows the position of the fan-shaped groove 2763 of the movable valve plate 276. As shown in FIG. 17, when the mixing valve assembly 21 is in the purified water mode, the fan-shaped groove 2763 of the movable valve plate 276 faces the third channel 2754 and the second channel 2752 on the fixed valve plate 275 so as to enable the third channel 2754 to communicate with the second channel 2752; and the lower surface 2762 of the movable valve plate 276 blocks the first channel 2751 and the auxiliary channel 2753 on the fixed valve plate 275, so that neither of the first channel 2751 and the auxiliary channel 2753 communicates with the third channel 2754. Therefore, in the purified water mode, only the second channel 2752 communicates with the third channel 2754 so as to enable the second inlet passage to communicate with the mixing valve outlet passage. When the switch handle 22 is rotated to open the water faucet 20, only purified water can flow from the second inlet passage to the mixing valve outlet passage and be dispensed from the outlet pipe 23 for use. Specifically, purified water obtained by means of filtration by the filtration assembly 10 enters the second inlet 2712 of the valve seat 271 by flowing through the purified water line L3, passes through the second channel 2752 on the fixed valve plate 275, flows to the third channel 2754 of the fixed valve plate 275 by means of the fan-shaped groove 2763 of the movable valve plate 276, further flows to the valve seat outlet 2714 of the valve seat 271, and is dispensed from the outlet pipe 23.

Figure 18:
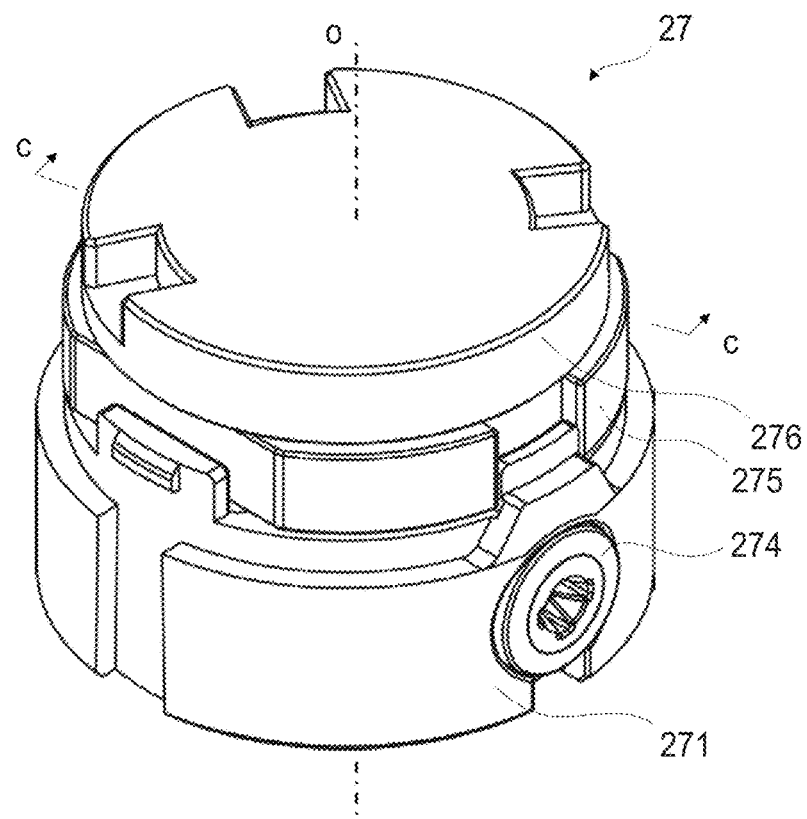
FIG. 18 is another perspective view of the valve seat, the fixed valve plate, and the movable valve plate in FIG. 6 that are mounted together.
Figure 19:
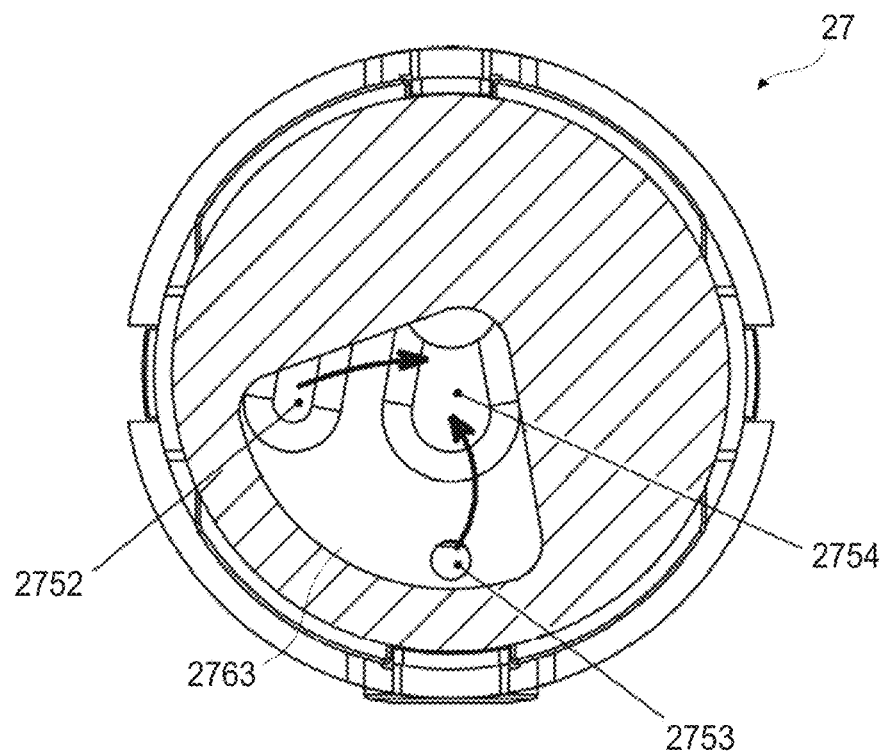
FIG. 19 is a cross-sectional view perpendicular to a central axis of a mixing valve and taken along the cross-sectional line C-C in FIG. 18.

FIG. 18, which is another perspective view of the movable valve plate 276, the fixed valve plate 275, and the valve seat 271 that are hermetically mounted together, shows the status of the mixing valve assembly 21 in the mixed water mode. FIG. 19 is a cross-sectional view perpendicular to the central axis O of the mixing valve 27 and taken along the cross-sectional line C-C in FIG. 18, and shows the position of the fan-shaped groove 2763 of the movable valve plate 276. As shown in FIG. 19, when the mixing valve assembly 21 is in the mixed water mode, the fan-shaped groove 2763 of the movable valve plate 276 enables the second channel 2752, the auxiliary channel 2753, and the third channel 2754 to communicate with each other; and the lower surface 2762 of the movable valve plate 276 blocks the first channel 2751 on the fixed valve plate 275, so that the first channel 2751 does not communicate with the third channel 2754. Therefore, in the mixed water mode, both the second channel 2752 and the auxiliary channel 2753 communicate with the third channel 2754 so as to enable the second inlet passage and the auxiliary inlet passage to communicate with the mixing valve outlet passage. When the switch handle 22 is rotated to open the water faucet 20, purified water and mineral water respectively flow from the second inlet passage and the auxiliary inlet passage to the mixing valve outlet passage, and are mixed with each other before being dispensed from the outlet pipe 23 for use. Specifically, purified water obtained by means of filtration by the filtration assembly 10 enters the second inlet 2712 of the valve seat 271 by flowing through the purified water line L3, passes through the second channel 2752 on the fixed valve plate 275, and flows to the third channel 2754 of the fixed valve plate 275 by means of the fan-shaped groove 2763 of the movable valve plate 276. Meanwhile, mineral water obtained by means of filtration by the filtration assembly 10 enters the auxiliary ports 2716 of the valve seat 271 by flowing through the mineral water line L2, enters the auxiliary hole 2713 by means of one of the auxiliary ports, passes through the auxiliary channel 2753 on the fixed valve plate 275, and flows to the third channel 2754 of the fixed valve plate by means of the fan-shaped groove 2763 of the movable valve plate 276. The purified water and the mineral water flowing into the third channel 2754 are mixed, flow to the valve seat outlet 2714 of the valve seat 271, and are dispensed from the outlet pipe 23.

Figure 20:
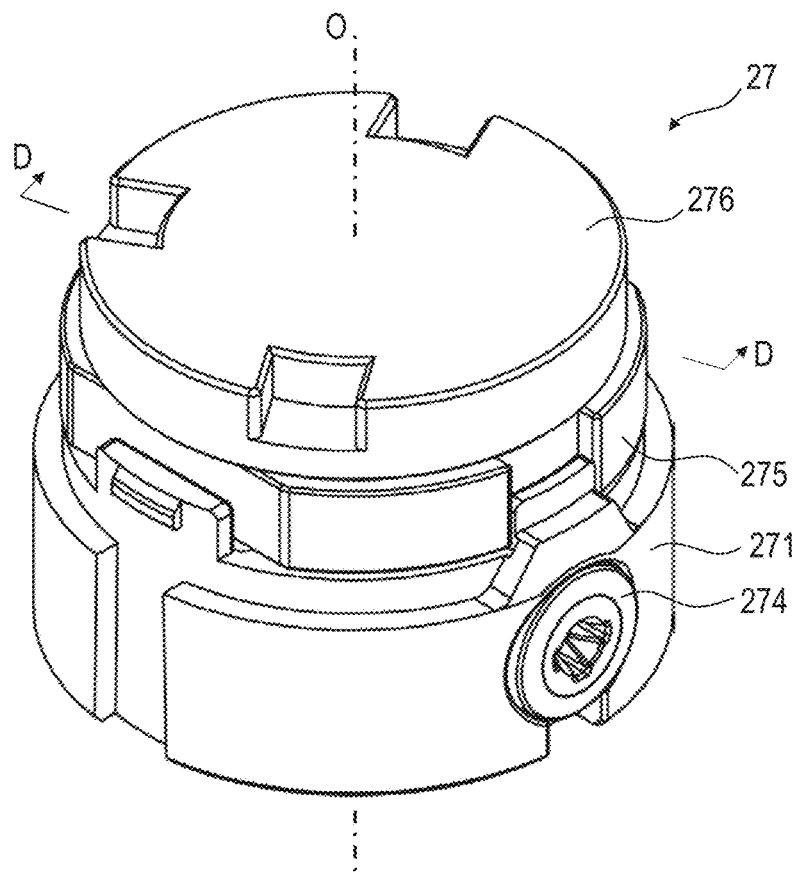
FIG. 20 is still another perspective view of the valve seat, the fixed valve plate, and the movable valve plate in FIG. 6 that are mounted together.
Figure 21:
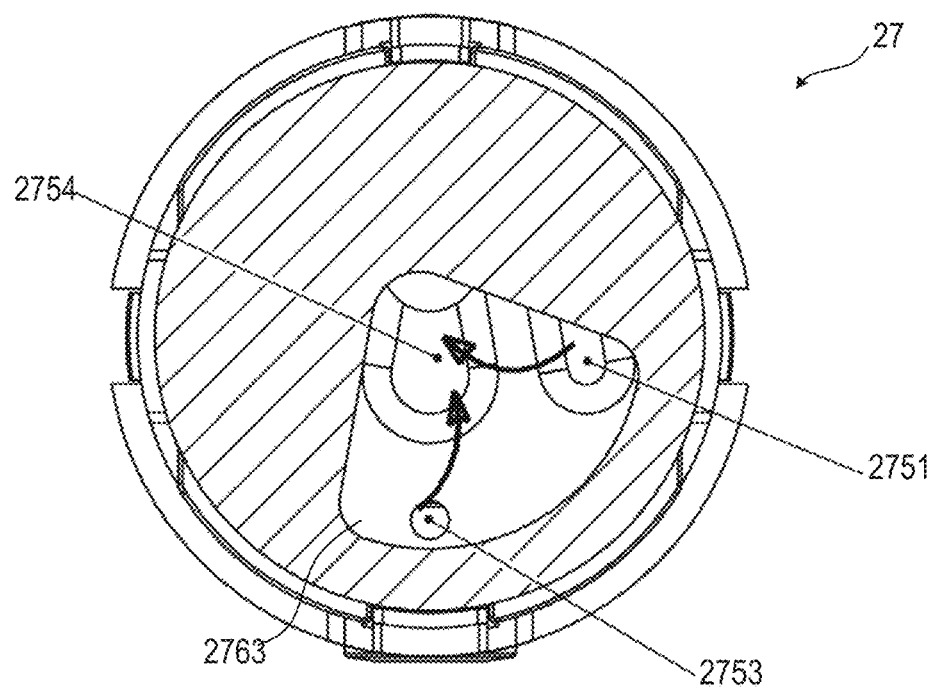
FIG. 21 is a cross-sectional view perpendicular to a central axis of a mixing valve and taken along the cross-sectional line D-D in FIG. 20.

FIG. 20, which is still another perspective view of the movable valve plate 276, the fixed valve plate 275, and the valve seat 271 that are hermetically mounted together, shows the status of the mixing valve assembly 21 in the mineral water mode. FIG. 21 is a cross-sectional view perpendicular to the central axis O of the mixing valve 27 and taken along the cross-sectional line D-D in FIG. 20, and shows the position of the fan-shaped groove 2763 of the movable valve plate 276. As shown in FIG. 21, when the mixing valve assembly 21 is in the mineral water mode, the fan-shaped groove 2763 of the movable valve plate 276 enables the first channel 2751, the auxiliary channel 2753, and the third channel 2754 to communicate with each other; and the lower surface 2762 of the movable valve plate 276 blocks the second channel 2752 on the fixed valve plate 275, so that the second channel 2752 does not communicate with the third channel 2754. Therefore, in the mineral water mode, both the first channel 2751 and the auxiliary channel 2753 communicate with the third channel 2754 so as to enable the first inlet passage and the auxiliary inlet passage to communicate with the mixing valve outlet passage. When the switch handle 22 is rotated to open the water faucet 20, mineral water can flow from the first inlet passage and the auxiliary inlet passage to the mixing valve outlet passage and be dispensed from the outlet pipe 23 for. Specifically, mineral water obtained by means of filtration by the filtration assembly 10 flows through the mineral water line L2, enters the first inlet 2711 and the auxiliary ports 2716 of the valve seat 271, passes through the first channel 2751 and the auxiliary channel 2753 on the fixed valve plate 275, flows to the third channel 2754 on the fixed valve plate 275 by means of the fan-shaped groove 2763 of the movable valve plate 276, further flows to the valve seat outlet 2714 of the valve seat 271, and is dispensed from the outlet pipe 23.

Figure 22:
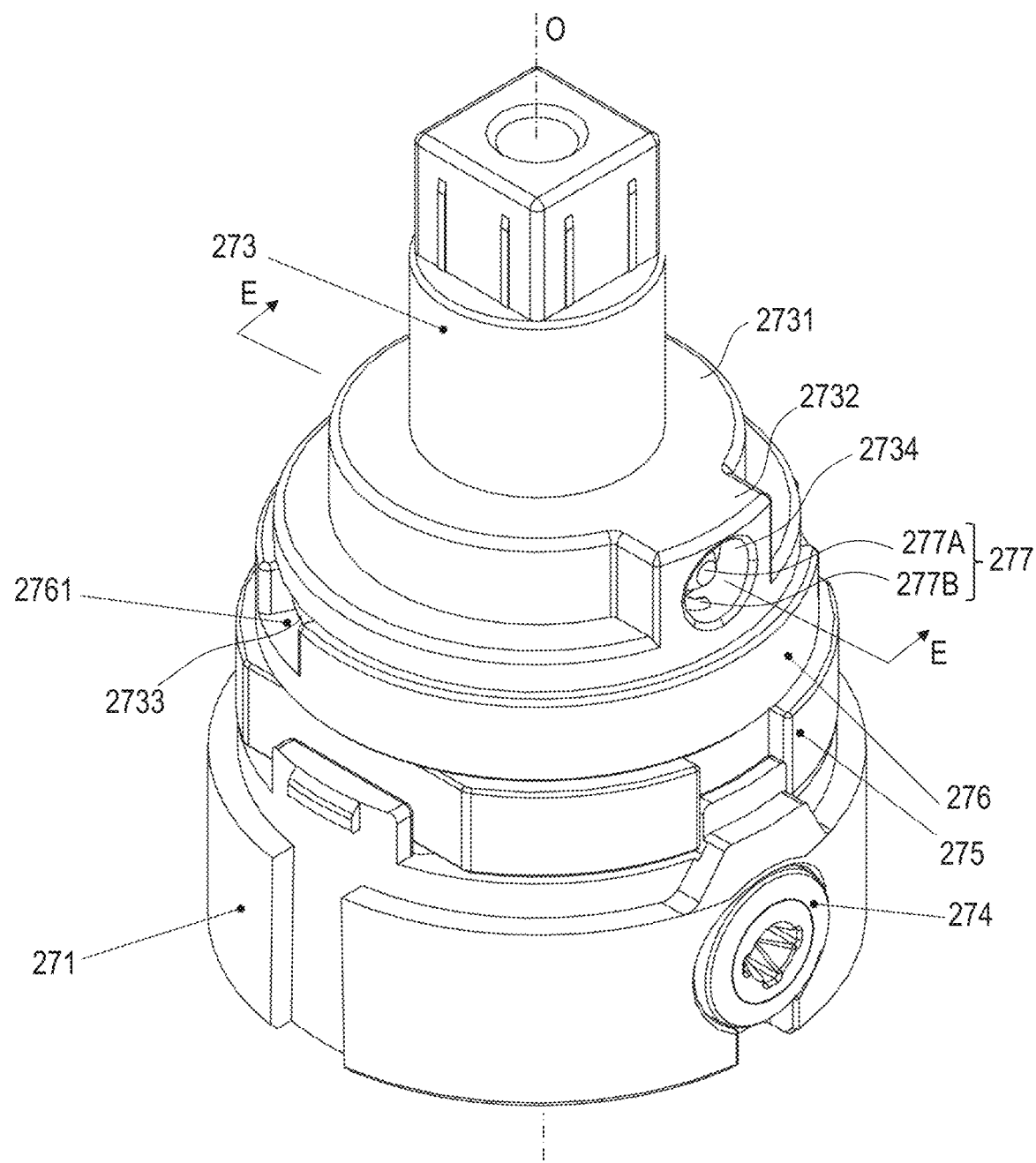
FIG. 22 is a perspective view of the mixing valve in FIG. 4 from which a valve core housing has been removed.

FIG. 22 is a perspective view of the rotation shaft 273, the mode selection indication device 277, the movable valve plate 276, the fixed valve plate 275, and the valve seat 271 that are mounted together, and is a perspective view showing the mixing valve 27 from which the valve core housing 272 has been removed. As shown in FIG. 22, the rotation shaft 273 is mounted on the upper surface of the movable valve plate 276 to allow the driving force transmission part 2733 of the rotation shaft 273 to engage in the fitting groove 2761 of the movable valve plate 276, so that operating torque applied by means of the mode selection device 25 (see FIG. 2 and FIG. 3) can be transmitted by the rotation shaft 273 to the movable valve plate 276; and the movable valve plate rotates relative to the fixed valve plate 275, so as to select an operation mode of the water faucet. A flange part 2731 is formed at a lower end part of the rotation shaft 273. The flange part 2731 is provided with a curved protruding part 2732. The protruding part 2732 is provided with an installation hole 2734 extending radially inwards from a periphery of the flange part 2731. The mode selection indication device 277 is mounted in the installation hole 2734. When the mode selection device 25 is rotated to a position corresponding to an operation mode, the mode selection indication device 277 sends indication information. In this example, the mode selection indication device 277 comprises a movable bolt 277A and a spring 277B. The spring 277B is mounted around the movable bolt 277A, such that under the action of the spring 277B, the movable bolt 277A can move radially in the installation hole 2734. In other examples according to the present invention, the mode selection indication device 277 can also be in other forms.

Figure 23:
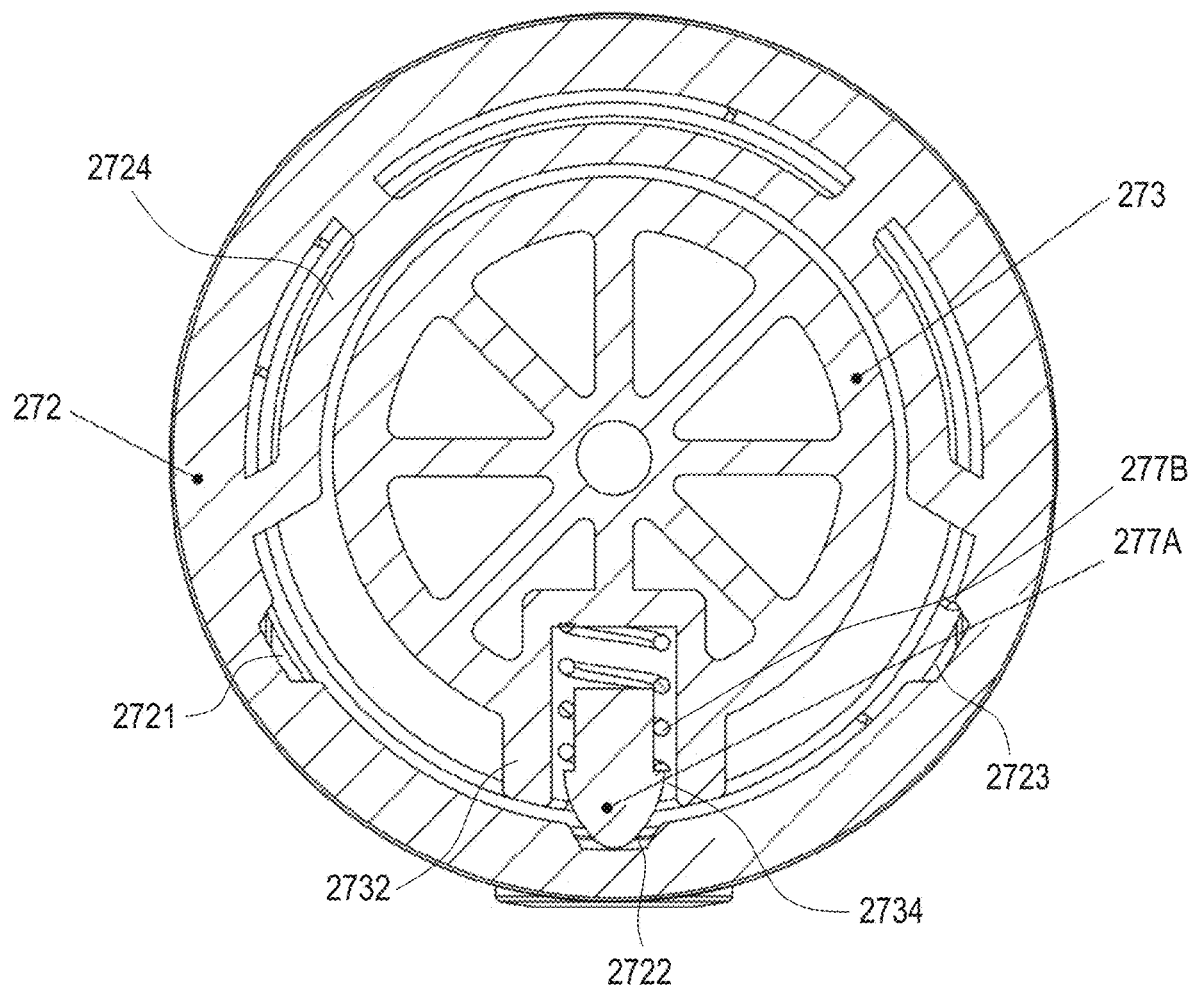
FIG. 23 is a cross-sectional view perpendicular to a central axis of a mixing valve and taken along the cross-sectional line E-E in FIG. 22.

FIG. 23 is a cross-sectional view perpendicular to the central axis O of the mixing valve 27 and taken along the cross-sectional line E-E in FIG. 22, and shows the engagement between the mode selection indication device 277 and the valve core housing 272. As shown in FIG. 23, an inner wall of the valve core housing 272 is provided with three grooves spaced apart, namely, a first groove 2721, a second groove 2722, and a third groove 2723. When the mode selection device 25 drives the rotation shaft 273 to rotate to a position corresponding to an operation mode, one of the first groove 2721, the second groove 2722, and the third groove 2723 on the inner wall of the valve core housing 272 aligns with the installation hole 2734 of the rotation shaft 273. For example, as shown in FIG. 23, the second groove 2722 aligns with the installation hole 2734 of the rotation shaft 273. In this case, the movable bolt 277A, under the action of the spring 277B, can move radially outwards to protrude into the second groove 2722 so as to send out a click sound as a prompt for indicating that the mode selection device 25 has rotated to an operation mode.

FIG. 24 to FIG. 26 are respective cross-sectional views taken along the cross-sectional line A-A in FIG. 4, and each shows that the first auxiliary port 2716A, the second auxiliary port 2716B, and the third auxiliary port 2716C communicate with the auxiliary hole 2713 via the adjustment bolt 274, so as to provide mixed water of a different mixing ratio.

FIG. 24 shows that the first auxiliary port 2716A communicates with the auxiliary hole 2713 via the adjustment bolt 274. In this case, a level mark (not shown) on the end part of the adjustment bolt 274 aligns with a first mixing ratio level identifier (not shown) provided on the housing 24 of the mixing valve assembly 21. As shown in FIG. 24, the first auxiliary port 2716A, the second auxiliary port 2716B, and the third auxiliary port 2716C respectively align with the first through hole S21, the second through hole S22, and the third through hole S23 of the auxiliary port seal S2. In this case, the first through hole S21 of the auxiliary port seal S2 aligns with the second circumferential groove 2746 on the adjustment bolt 274, communicates with the annular communication groove 2744 via the second axial groove 2749 (see FIG. 11) on the adjustment bolt 274, and communicates with the auxiliary hole 2713 of the valve seat 271, so as to communicate with the auxiliary channel 2753 of the fixed valve plate 275. Through this design, mineral water can then flow from the first auxiliary port 2716A to enter the valve seat 271, enter the auxiliary channel 2753 of the fixed valve plate 275 by means of the auxiliary hole 2713 of the valve seat 271, and selectively flow to the third channel 2754 of the fixed valve plate 275 by means of the fan-shaped groove 2763 of the movable valve plate 276, as indicated by the arrowed lines in FIG. 24. In this state, the auxiliary inlet passage comprises the first auxiliary port 2716A of the valve seat 271, the second circumferential groove 2746, the second axial groove 2749, the annular communication groove 2744 of the adjustment bolt 274, the auxiliary hole 2713 of the valve seat 271, and the auxiliary channel 2753 of the fixed valve plate 275. The second auxiliary port 2716B and the third auxiliary port 2716C of the valve seat 271 are both blocked by the adjustment bolt 274. The first auxiliary port 2716A is an auxiliary port having the largest diameter among the first auxiliary port 2716A, the second auxiliary port 2716B, and the third auxiliary port 2716C. In some embodiments, the diameter of first auxiliary port 2716A can be configured to be in the range of from 1.3 millimeters to 1.6 millimeters. In the mixed water mode and when the first auxiliary port 2716A communicates with the auxiliary hole 2713, in one example, a mixing ratio of mineral water and purified water flowed into the third channel 2754 is configured so that the ratio of the total dissolved solids (TDS) of the mixed water dispensed from the valve seat outlet 2714 and the total dissolved solids (TDS) of the mineral water can be in the range of from 45:100 to 55:100. The total dissolved solids (TDS) of water represents the total quantity of all ions, molecules, and compounds dissolved in the water, which is also referred to as salinity of the water.

FIG. 25 shows that the third auxiliary port 2716C communicates with the auxiliary hole 2713 via the adjustment bolt 274. In this case, the level mark (not shown) on the end part of the adjustment bolt 274 aligns with a second mixing ratio level identifier (not shown) provided on the housing 24 of the mixing valve assembly 21. As shown in FIG. 25, the third through hole S23 of the auxiliary port seal S2 aligns with the third circumferential groove 2747 on the adjustment bolt 274, communicates with the annular communication groove 2744 via the first axial groove 2748 (see FIG. 10) on the adjustment bolt 274, and communicates with the auxiliary hole 2713 of the valve seat 271, so as to communicate with the auxiliary channel 2753 of the fixed valve plate 275; through this design, mineral water can flow from the third auxiliary port 2716C to enter the valve seat 271, enter the auxiliary channel 2753 of the fixed valve plate 275 by means of the auxiliary hole 2713 of the valve seat 271, and selectively flow to the third channel 2754 of the fixed valve plate 275 by means of the fan-shaped groove 2763 of the movable valve plate 276, as indicated by the arrowed lines in FIG. 25. In this state, the auxiliary inlet passage comprises the third auxiliary port 2716C of the valve seat 271, the third circumferential groove 2747, the first axial groove 2748, the annular communication groove 2744 of the adjustment bolt 274, the auxiliary hole 2713 of the valve seat 271, and the auxiliary channel 2753 of the fixed valve plate 275. The first auxiliary port 2716A and the second auxiliary port 2716B of the valve seat 271 are both blocked by the adjustment bolt 274. The third auxiliary port 2716C is an auxiliary port having the smallest diameter among the first auxiliary port 2716A, the second auxiliary port 2716B, and the third auxiliary port 2716C. In some embodiments, the diameter of third auxiliary port 2716C can be configured to be in the range of from 0.5 millimeters to 0.8 millimeters. In the mixed water mode and when the third auxiliary port 2716C communicates with the auxiliary hole 2713, in one example, the mixing ratio of mineral water and purified water flowed into the third channel 2754 is configured so that the ratio of the TDS of the mixed water dispensed from the valve seat outlet 2714 and the TDS of the mineral water can be in the range of from 20:100 to 30:100.

FIG. 26 shows that the second auxiliary port 2716B communicates with the auxiliary hole 2713 via the adjustment bolt 274. In this case, the level mark (not shown) on the end part of the adjustment bolt 274 aligns with a third mixing ratio level identifier (not shown) provided on the housing 24 of the mixing valve assembly 21. As shown in FIG. 26, the second through hole S22 of the auxiliary port seal S2 aligns with the first circumferential groove 2745 on the adjustment bolt 274, communicates with the annular communication groove 2744 via the first axial groove 2748 (see FIG. 10) on the adjustment bolt 274, and communicates with the auxiliary hole 2713 of the valve seat 271, so as to communicate with the auxiliary channel 2753 of the fixed valve plate 275; through this design, mineral water can flow from the second auxiliary port 2716B to the valve seat 271, enter the auxiliary channel 2753 of the fixed valve plate 275 by means of the auxiliary hole 2713 of the valve seat 271, and selectively flow to the third channel 2754 of the fixed valve plate 275 through the fan-shaped groove 2763 of the movable valve plate 276, as indicated by the arrowed lines in FIG. 26. In this state, the auxiliary inlet passage comprises the second auxiliary port 2716B of the valve seat 271, the first circumferential groove 2745, the first axial groove 2748, the annular communication groove 2744 of the adjustment bolt 274, the auxiliary hole 2713 of the valve seat 271, and the auxiliary channel 2753 of the fixed valve plate 275. The first auxiliary port 2716A and the third auxiliary port 2716C of the valve seat 271 are both blocked by the adjustment bolt 274. The diameter of the second auxiliary port 2716B is between the diameter of the first auxiliary port 2716A and the diameter of the third auxiliary port 2716C. In some embodiments, the diameter of the second auxiliary port 2716B can be configured to be in the range of from 0.85 millimeters to 1.15 millimeters. In the mixed water mode and when the second auxiliary port 2716B communicates with the auxiliary hole 2713, in one example, the mixing ratio of mineral water and purified water flowed into the third channel 2754 is configured so that the ratio of the TDS of the mixed water dispensed from the valve seat outlet 2714 and the TDS of the mineral water can be in the range of from 30:100 to 45:100.

Based on the illustration shown from FIG. 23 to FIG. 26, one can see that the valve core housing 272 is provided with a curved protruding stopping part 2724. When the mode selection device 25 drives the rotation shaft 273 to rotate, the protruding stopping part 2724 of the valve core housing 272 is adapted to abut the protruding part 2732 (see FIG. 22) of the rotation shaft 273, so as to define a range within which the rotation shaft 273 rotates relative to the valve core housing 272, thereby preventing the mode selection device 25 and the rotation shaft 273 from rotating excessively.

In addition, based on the illustration shown from FIG. 24 to FIG. 26, one sees that, in some embodiments, the first auxiliary port 2716A, the second auxiliary port 2716B, and the third auxiliary port 2716C are each configured to comprise a hole part in the shape of a conical frustum and a straight through hole part, so as to allow a fluid to flow smoothly through any one of the first auxiliary port 2716A, the second auxiliary port 2716B, and the third auxiliary port 2716C to enter the valve seat 271.

Figure 27:
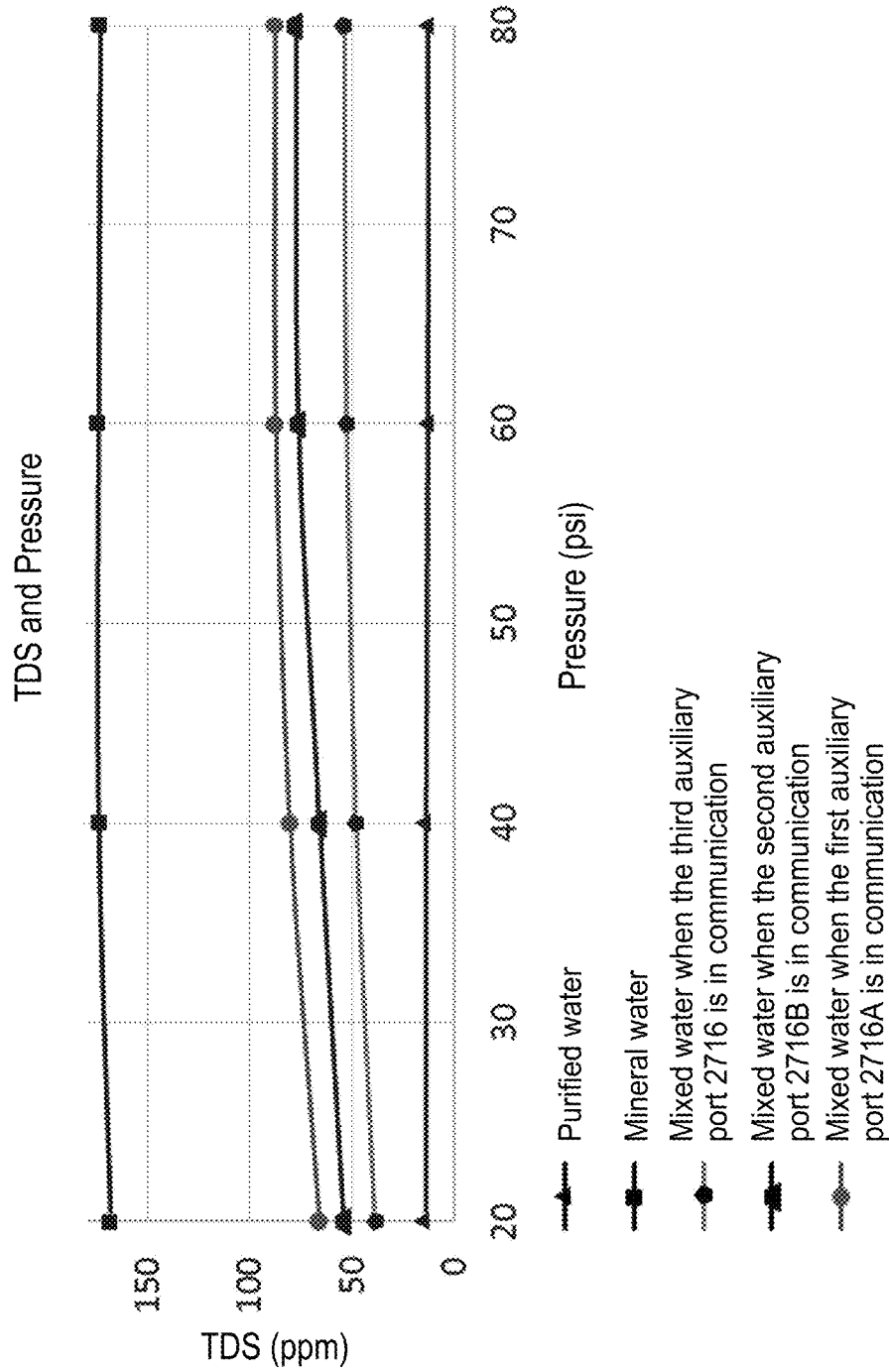
FIG. 27 is a test data curve graph of a faucet of a municipal tap water filtration system according to the present invention.

The above describes the structure and working principle of the household water filter 1 according to the present invention. The adjustment mode selection device 25 and the adjustment bolt 274 are configured to operate independently from each other, so that the household water filter 1 according to the present invention can obtain water that is purified and has an accurate and stable mixing ratio. FIG. 27 is a curve graph of test data of a test performed on the household water filter 1 that is obtained according to an example. FIG. 28 shows each specific parameter on each curve in FIG. 27.

FIG. 27 shows the relationship between a municipal water supply pressure and total dissolved solids of output water of a household water filter, where the abscissa represents the municipal water supply pressure, the ordinate represents the total dissolved solids (TDS) of water that is purified and dispensed from the outlet pipe 23 of the water faucet 20 of the household water filter. In this test, the TDS of mineral water, purified water, and mixed water at different municipal water supply pressures is measured. As shown in FIG. 27 and FIG. 28, with the municipal water supply pressure being the same, the TDSs of purified water, mineral water, and mixed water of different mixing ratios that are dispensed from the outlet pipe 23 can all be differentiated from one another. For example, when the municipal water supply pressure is 20 psi, the TDS of water dispensed from the outlet pipe 23 is 14 ppm in the purified water mode; the TDS of water dispensed from the outlet pipe 23 is 168 ppm in the mineral water mode; in the mixed water mode, the TDS of water dispensed from the outlet pipe 23 is 39 ppm when the third auxiliary port 2716C communicates with the auxiliary hole 2713; the TDS of water dispensed from the outlet pipe 23 is 54.2 ppm when the second auxiliary port 2716B communicates with the auxiliary hole 2713; and the TDS of water dispensed from the outlet pipe 23 is 66 ppm when the first auxiliary port 2716A communicates with the auxiliary hole 2713. The changing trend of the above data fully corresponds to the features of the water faucet 20 in different operation modes. That is, the TDS of water in the purified water mode is the smallest; the TDS of water in the mineral water mode is the largest; and in the mixed water mode, a larger diameter of the auxiliary port communicating with the auxiliary hole 2713 leads to a greater TDS of the mixed water. In addition, at different municipal water supply pressures in the same operation mode, the TDSs of output water at the different municipal water supply pressures are substantially in a stable range. For example, at different municipal water supply pressures, the TDS of water is in the range of from 13 ppm to 14 ppm in the purified water mode; the TDS of water is in the range of from 168 ppm to 174 ppm in the mineral water mode; in the mixed water mode, the TDS of mixed water ranges between 39 ppm and 54 ppm when the third auxiliary port 2716C communicates with the auxiliary hole 2713; the TDS of mixed water ranges between 54.2 ppm and 77.4 ppm when the second auxiliary port 2716B communicates with the auxiliary hole 2713; and the TDS of mixed water ranges between 66 ppm and 87.6 ppm when the first auxiliary port 2716A communicates with the auxiliary hole 2713. The household water filter according to the present invention can allow water dispensed from the outlet pipe to have a relatively accurate and stable mixing ratio, so as to obtain the mixed water with the desired TDS.

In the household water filter 1 according to the present invention, the mode selection device 25 and the mixing ratio adjustment device (the adjustment bolt 274) used for adjusting the mixing ratio of the mineral water and the purified water in the mixed water are configured to operate independently from each other. During installation of the household water filter 1, a technician selects, according to local water quality, a mixing ratio suitable for a local region and a user via the adjustment mixing ratio adjustment device (the adjustment bolt 274), to make the mixed water flowed out from the water faucet to have a proper TDS. Once the household water filter is completely installed, the user can select desired water quality by means of only the mode selection device 25; and operating the mode selection device 25 does not cause the adjustment bolt 274 to rotate relative to the valve seat to change the mixing ratio. Therefore, by means of the above configuration, a user does not need to select one mixing ratio of a plurality of mixing ratios during each time of use, thereby simplifying user's operation. The above selection method of the operation mode for the water faucet of the household water filter accords with the operating habits of the user. Certainly, after the household water filter according to the present invention is installed, the user can also use the mixing ratio adjustment device to adjust the mixing ratio of the mineral water and the purified water in the mixed water based on needs so as to obtain a mixed water with the desired TDS.

In addition, in the household water filter according to the present invention, the mode selection device can be used for selecting any operation mode of the three operation modes of the water faucet, so that water with the water quality corresponding to the operation modes is dispensed from the outlet pipe of the same water faucet, namely, purified water, mineral water, and mixed water of purified water and mineral water, without having to install a plurality of water faucets for different operation modes or water quality. In addition, only the mode selection device is used for driving the movable valve plate to rotate to allow one or both of the mineral water line and the purified water line to communicate with the mixing valve outlet passage, without having to install a separate switch valve for each line. Therefore, compared with existing household water filters, the household water filter having the faucet according to the present invention has fewer parts and components, is miniaturized, and is easier to install. In addition, in the household water filter according to the present invention, the mixing ratio adjustment device (the adjustment bolt 274) is used for allowing one auxiliary port of the three auxiliary ports with different diameters to communicate with the auxiliary hole 2713, so as to select mixed water with a different mixing ratio. Therefore, in the household water filter according to the present invention, five water quality options can be provided: purified water, mineral water, and three options of mixed water with different mixing ratios of mineral water and purified water. Therefore, the household water filter according to the present invention can meet users' needs for different water qualities, and can further configure an appropriate mixing ratio according to different water quality at different regions, thereby expanding the application of the household water filter in different regions.

The faucet according to the preferred embodiment of the present invention and the filtration system having the faucet are illustrated above by applying the present invention in a household water filter. However, the present invention is not limited to the above preferred embodiments. Modifications can be made to the above preferred embodiments on the basis of the ideas of the present invention, and these modifications all fall within the scope of the present invention.

In the above preferred embodiment, the valve seat is provided with the three auxiliary ports having different diameters, and the mixing ratio adjustment device (the adjustment bolt 274) is correspondingly provided with three circumferential slots so as to selectively allow one of the three auxiliary ports to communicate with the auxiliary hole, thereby providing mixed water of three different mixing ratios. However, the present invention is not limited thereto; and in other embodiments according to the present invention, the valve seat can be provided with more or less auxiliary ports having different diameters; and the mixing ratio adjustment device (the adjustment bolt 274) is correspondingly designed to provide mixed water of more different mixing ratios.

In the above preferred embodiment, the auxiliary inlet passage communicates with the mineral water line L2, so that mineral water can enter the mixing valve 21 through the first inlet passage and the auxiliary inlet passage. However, the present invention is not limited thereto. In other embodiments according to the present invention, the auxiliary inlet passage can communicate with the purified water line L3, so that purified water can enter the mixing valve through the second inlet passage and the auxiliary inlet passage, and mixed water of a plurality of different mixing ratios can also be provided.

In the above preferred embodiment, the mixing ratio adjustment device (the adjustment bolt 274) is rotatable relative to the valve seat in the adjustment hole 2715 of the valve seat 271; and the three circumferential grooves of the mixing ratio adjustment device (the adjustment bolt 274) that are spaced apart axially are configured to be spaced apart and not overlapping in the circumferential direction of the mixing ratio adjustment device (the adjustment bolt 274); a rotation relative to the valve seat 271 then allows one auxiliary port of the three auxiliary ports of the valve seat 271 to selectively communicate with one circumferential groove of the mixing ratio adjustment device (the adjustment bolt 274) and then to communicate with the auxiliary hole, so as to adjust the mixing ratio of the mineral water and the purified water in the mixed water. However, the present invention is not limited thereto. In other embodiments according to the present invention, the mixing ratio adjustment device (the adjustment bolt 274) can be configured to move linearly relative to the valve seat in the adjustment hole of the valve seat; and a plurality of circumferential grooves on the mixing ratio adjustment device (the adjustment bolt 274) that are spaced apart axially can be configured to at least partially overlap with each other in the circumferential direction of the mixing ratio adjustment device (the adjustment bolt 274), so that linear movement of the mixing ratio adjustment device (the adjustment bolt 274) relative to the valve seat allows one auxiliary port of a plurality auxiliary ports to communicate with a corresponding circumferential groove on the mixing ratio adjustment device (the adjustment bolt 274) and then to communicate with the auxiliary hole, so as to adjust the mixing ratio of the mineral water and the purified water in the mixed water so as to obtain a mixed water with the desired TDS.

In the above preferred embodiment, the three auxiliary ports extend from the adjustment hole of the valve seat to the lower surface of the valve seat; the auxiliary hole extends from the adjustment hole of the valve seat to the upper surface of the valve seat; and one auxiliary port of the three auxiliary ports of the valve seat aligns and communicates with the corresponding circumferential groove on the mixing ratio adjustment device (the adjustment bolt 274), so as to adjust the mixing ratio of the mineral water and the purified water in the mixed water and thereby adjust the TDS of the mixed water. However, the present invention is not limited thereto. In other embodiments according to the present invention, the three auxiliary ports can extend from the adjustment hole of the valve seat to the upper surface of the valve seat; the auxiliary hole extends from the adjustment hole of the valve seat to the lower surface of the valve seat; the fixed valve plate is correspondingly adjusted, and the mixing ratio adjustment device (the adjustment bolt 274) can also be used for selectively allowing the auxiliary hole to communicate with one auxiliary port of the plurality of auxiliary ports, so as to adjust the mixing ratio of the mineral water and the purified water in the mixed water to obtain a mixed water with the desired TDS.

In the above preferred embodiment, the first channel, the second channel, and the third channel on the fixed valve plate are each configured to comprise a through hole part and a slot with a base. However, the present invention is not limited thereto. In other embodiments according to the present invention, one or more of the first channel, the second channel, and the third channel on the fixed valve plate can be configured to be in the form of through holes and comprise no slots with bases.

The exemplary embodiments of the present invention are described herein in detail with reference to the application of the faucet according to the present invention and the filtration system having the faucet in the field of filtration of drinking water. However, it should be understood that the present invention is not limited to the specific embodiments described in detail and illustrated above. Persons skilled in the art can make various variations of the present invention without departing from the subject and scope of the present invention. All these variations fall within the scope of the present invention. In addition, all members described herein can be replaced with other technically equivalent members.

The invention claimed is:

1. A faucet (20), comprising:
    a mixing valve (27), wherein the mixing valve (27) is provided with a first inlet passage, a second inlet passage, an auxiliary inlet passage, and a mixing valve outlet passage; the first inlet passage is connected to a first fluid line (L2) for a first fluid, the second inlet passage is connected to a second fluid line (L3) for a second fluid, and the auxiliary inlet passage communicates with the first fluid line (L2) or the second fluid line (L3), wherein the mixing valve (27) comprises a valve seat (271), a fixed valve plate (275), and a movable valve plate (276); wherein the valve seat (271) is provided with a first inlet (2711), a second inlet (2712), and a valve seat outlet (2714) penetrating therethrough; and the valve seat (271) is further provided with an auxiliary hole (2713); the fixed valve plate (275) is provided with a first channel (2751), a second channel (2752), a third channel (2754), and an auxiliary channel (2753) penetrating therethrough; the fixed valve plate (275) is securely mounted on the valve seat (271), allowing the first inlet (2711), the second inlet (2712), and the valve seat outlet (2714) of the valve seat (271) to respectively communicate with the first channel (2751), the second channel (2752), and the third channel (2754) of the fixed valve plate (275), so that the first inlet passage comprises the first inlet (2711) and the first channel (2751), the second inlet passage comprises the second inlet (2712) and the second channel (2752), the mixing valve outlet passage comprises the valve seat outlet (2714) and the third channel (2754), and the auxiliary inlet passage comprises the auxiliary hole and the auxiliary channel; the movable valve plate (276) is mounted onto the fixed valve plate (275), and a joint face between the fixed valve plate (275) and the movable valve plate (276) is a sealing joint face; the movable valve plate (276) is provided with a recess part (2763) recessing from the sealing joint face;

an outflowing pipe (23), wherein one end of the outflowing pipe (23) is connected to an outlet passage of the mixing valve; and a mode selection device (25), wherein the mode selection device is connected to the mixing valve (27); the mode selection device (25) is operable to select an operation mode of the faucet (20), so as to selectively allow one or both of the first fluid line (L2) and the second fluid line (L3) to communicate with the mixing valve outlet passage and is operable to selectively allow the auxiliary inlet passage to communicate with the mixing valve outlet passage, wherein the mode selection device (25) is connected to the movable valve plate (276), and the mode selection device (25) is operable to allow the movable valve plate (276) to rotate relative to the fixed valve plate (275), so that the recess part (2763) enables one or two of the first inlet passage, the second inlet passage, and the auxiliary inlet passage to communicate with the mixing valve outlet passage, wherein the faucet (20) further comprises a mixing ratio adjustment device; the mixing ratio adjustment device is operable to adjust a mixing ratio of the first fluid and the second fluid, and the mixing ratio adjustment device and the mode selection device (25) operate independently from one another.

2. The faucet (20) according to claim 1, wherein one or more of the first channel (2751), the second channel (2752), and the third channel (2754) of the fixed valve plate (275) comprises a through hole part and a slot having a base, the through hole part penetrating the fixed valve plate (275) and penetrating a part of the base of the slot.

3. The faucet (20) according to claim 1, wherein the mixing ratio adjustment device is operably provided within an adjustment hole (2715) of the valve seat (271); and the valve seat (271) is further provided with a plurality of auxiliary ports (2716A, 2716B, and 2716C) with different diameters; the mixing ratio adjustment device is operable to allow only one auxiliary port of the plurality of auxiliary ports (2716A, 2716B, and 2716C) to communicate with the auxiliary hole (2713), and the rest auxiliary ports of the plurality of auxiliary ports (2716A, 2716B, and 2716C) are all blocked by the mixing ratio adjustment device.

4. The faucet (20) according to claim 3, wherein the mixing ratio adjustment device is an adjustment bolt (274); the adjustment bolt is provided with an annular communication groove (2744) and a plurality of circumferential grooves (2745, 2746, and 2747) spaced apart in an axial direction of the adjustment bolt (274); the annular communication groove (2744) forms a part of the auxiliary inlet passage, and the plurality of circumferential grooves (2745, 2746, and 2747) respectively communicate with the annular communication groove (2744), wherein the adjustment bolt (274) in the adjustment hole (2715) is adjustable to allow only one auxiliary port of the plurality of auxiliary ports (2716A, 2716B, and 2716C) to align to and communicate with a corresponding circumferential groove of the plurality of circumferential grooves (2745, 2746, and 2747).

5. The faucet (20) according to claim 4, wherein the adjustment bolt (274) is rotatable relative to the valve seat (271) in the adjustment hole (2715), and the plurality of circumferential grooves (2745, 2746, 2747) are spaced apart and not overlapping in the circumferential direction of the adjustment bolt (274).

6. The faucet (20) according to claim 3, wherein the plurality of auxiliary ports (2716A, 2716B, and 2716C) extends from the adjustment hole (2715) to a lower surface (271B) of the valve seat (271), and the auxiliary hole (2713) extends from the adjustment hole (2715) to an upper surface (271A) of the valve seat (271).

7. The faucet (20) according to claim 3, wherein the faucet (20) further comprises an auxiliary port seal (S2); the auxiliary port seal (S2) is provided with a plurality of through holes (S21, S22, and S23) corresponding to the plurality of auxiliary ports (2716A, 2716B, and 2716C); the auxiliary port seal (S2) is provided within the adjustment hole (2715) so as to allow the plurality of auxiliary ports (2716A, 2716B, and 2716C) to be hermetically separated from one another.

8. The faucet (20) according to claim 3, wherein the plurality of auxiliary ports (2716A, 2716B, and 2716C) comprises three auxiliary ports.

9. The faucet (20) according to claim 1, wherein the faucet (20) is further provided with a mode selection indication device, the mode selection indication device configured to generate indication information when the mode selection device (25) selects an operation mode.

10. A filtration system (1) comprising a filtration assembly (10) for filtering a fluid and discharging a first fluid via a first fluid line (L2) and a second fluid via a second fluid line (L3), wherein the filtration system (1) further comprises the faucet (20) according to claim 1.

11. The filtration system (1) according to claim 10, wherein the filtration system (1) is a household water filter, the first fluid is mineral water, and the second fluid is the purified water.

* * * * *